US010412368B2

(12) United States Patent
Osterwood et al.

(10) Patent No.: US 10,412,368 B2
(45) Date of Patent: Sep. 10, 2019

(54) METHODS, SYSTEMS, AND APPARATUS FOR MULTI-SENSORY STEREO VISION FOR ROBOTICS

(71) Applicant: Uber Technologies, Inc., San Francisco, CA (US)

(72) Inventors: Christopher Charles Osterwood, Pittsburgh, PA (US); Daniel Leland Strother, Pittsburgh, PA (US); David Arthur LaRose, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 424 days.

(21) Appl. No.: 14/777,427

(22) PCT Filed: Mar. 14, 2014

(86) PCT No.: PCT/US2014/027126
§ 371 (c)(1),
(2) Date: Apr. 21, 2016

(87) PCT Pub. No.: WO2014/152254
PCT Pub. Date: Sep. 25, 2014

(65) Prior Publication Data
US 2016/0227193 A1 Aug. 4, 2016

Related U.S. Application Data

(60) Provisional application No. 61/792,468, filed on Mar. 15, 2013.

(51) Int. Cl.
*H04N 13/00* (2018.01)
*A61B 1/04* (2006.01)
(Continued)

(52) U.S. Cl.
CPC .......... *H04N 13/239* (2018.05); *B25J 9/1697* (2013.01); *G01S 7/4972* (2013.01);
(Continued)

(58) Field of Classification Search
USPC ............................................... 348/47, 42, 49
See application file for complete search history.

(56) References Cited

U.S. PATENT DOCUMENTS

| 3,333,519 A | 8/1967 | Padelt |
| 5,012,745 A | 5/1991 | Yamashita |

(Continued)

FOREIGN PATENT DOCUMENTS

| CN | 102494609 | 6/2012 |
| CN | 101959022 | 11/2012 |

(Continued)

OTHER PUBLICATIONS

First Office Action dated Dec. 15, 2016 in CN 201480022190.5.
(Continued)

*Primary Examiner* — Nigar Chowdhury
(74) *Attorney, Agent, or Firm* — Mahamedi IP Law LLP

(57) ABSTRACT

Embodiments of the present invention include multi-sensory stereo vision sensors suitable for use in robotics, navigation, machine vision, manufacturing, and other applications. In some cases, a sensor includes a stereo camera that produces image data for use in generating disparity maps to determine the positions of objects in the scene and/or the position of the sensor itself. The stereo sensor may include image sensors that are fastened to a unitary frame to prevent undesired drift and a thermal pad that wicks heat away from a processor. The processor may provide an efficient means to directly compute stereo disparity maps onboard the sensor. A sensor can also include a laser rangefinder that provides range data suitable for calibrating the stereo camera and for improving (Continued)

its accuracy in certain environments. In some cases, the laser is coupled to a spindle, which in turn is driven by a geartrain through a slipping clutch.

15 Claims, 30 Drawing Sheets

(51) Int. Cl.
| | |
|---|---|
| H04N 13/239 | (2018.01) |
| G01S 17/42 | (2006.01) |
| G01S 7/497 | (2006.01) |
| B25J 9/16 | (2006.01) |
| G06T 7/20 | (2017.01) |
| H04N 5/225 | (2006.01) |
| G03B 17/02 | (2006.01) |
| G03B 17/55 | (2006.01) |
| G03B 35/08 | (2006.01) |
| G06T 7/80 | (2017.01) |
| G06T 7/593 | (2017.01) |

(52) U.S. Cl.
CPC .............. *G01S 17/42* (2013.01); *G03B 17/02* (2013.01); *G03B 17/55* (2013.01); *G03B 35/08* (2013.01); *G06T 7/20* (2013.01); *G06T 7/593* (2017.01); *G06T 7/85* (2017.01); *H04N 5/2252* (2013.01); *H04N 5/2253* (2013.01); *H04N 5/2254* (2013.01); *G06T 2207/10012* (2013.01); *G06T 2207/10028* (2013.01); *H04N 2013/0081* (2013.01); *Y10S 901/47* (2013.01)

(56) References Cited

U.S. PATENT DOCUMENTS

| | | | |
|---|---|---|---|
| 5,309,522 A | 5/1994 | Dye | |
| 5,357,141 A | 10/1994 | Nitschke | |
| 5,590,604 A | 1/1997 | Lund | |
| 5,598,783 A | 2/1997 | Lund | |
| 6,122,040 A | 9/2000 | Arita | |
| 6,195,648 B1 | 2/2001 | Simon | |
| 6,657,705 B2 | 12/2003 | Sano | |
| 6,827,265 B2 | 12/2004 | Knowles | |
| 6,860,350 B2 | 3/2005 | Beuhler | |
| 6,956,227 B2 | 10/2005 | Miyazaki | |
| 7,106,365 B1 | 9/2006 | Sogawa | |
| 7,111,996 B2 | 9/2006 | Seger | |
| 7,248,342 B1 | 7/2007 | Degnan | |
| 7,650,239 B2 | 1/2010 | Samukawa | |
| 7,961,301 B2 | 6/2011 | Earhart | |
| 8,010,285 B1 | 8/2011 | Denise | |
| 8,108,119 B2 | 1/2012 | Southall | |
| 8,199,975 B2 | 6/2012 | Pomerleau | |
| 8,208,716 B2 | 6/2012 | Choi | |
| 8,344,940 B2 | 1/2013 | Jeong | |
| 8,385,630 B2 | 2/2013 | Sizintsev | |
| 8,411,145 B2 | 4/2013 | Fardi | |
| 8,417,448 B1 | 4/2013 | Denise | |
| 8,417,449 B1 | 4/2013 | Denise | |
| 8,447,098 B1 | 5/2013 | Cohen | |
| 8,538,158 B1 | 9/2013 | Denise | |
| 8,611,604 B2 | 12/2013 | Fujiyoshi | |
| 8,665,079 B2 | 3/2014 | Pawlicki | |
| 8,670,930 B2 | 3/2014 | Denise | |
| 8,718,926 B1 | 5/2014 | Denise | |
| 8,767,186 B2 | 7/2014 | Lu | |
| 8,797,828 B1 | 8/2014 | Lev | |
| 8,899,903 B1 | 12/2014 | Saad | |
| 8,909,375 B2 | 12/2014 | Larson | |
| 8,924,240 B2 | 12/2014 | Depura et al. | |
| 8,934,719 B1 | 1/2015 | Denise | |
| 8,994,581 B1 | 3/2015 | Brown | |
| 9,097,545 B1 | 8/2015 | Denise | |
| 9,126,595 B2 | 9/2015 | Seo, II | |
| 9,191,634 B2 | 11/2015 | Schofield | |
| 9,196,160 B2 | 11/2015 | Aoki | |
| 9,201,424 B1 | 12/2015 | Ogale | |
| 9,221,396 B1 | 12/2015 | Zhu | |
| 9,224,053 B1 | 12/2015 | Ferguson | |
| 9,228,833 B2 * | 1/2016 | Zeng | G01C 11/06 |
| 9,231,998 B2 | 1/2016 | Lu et al. | |
| 9,247,211 B2 * | 1/2016 | Zhang | H04N 7/18 |
| 9,278,689 B1 | 3/2016 | Delp | |
| 9,315,151 B2 | 4/2016 | Taylor | |
| 9,328,526 B2 | 5/2016 | Shani | |
| 9,383,753 B1 | 7/2016 | Templeton | |
| 9,403,491 B2 | 8/2016 | Happy | |
| 9,436,880 B2 | 9/2016 | Bos | |
| 9,453,914 B2 | 9/2016 | Stettner | |
| 9,509,979 B2 | 11/2016 | Livyatan | |
| 9,555,736 B2 | 1/2017 | Solar | |
| 9,555,803 B2 | 1/2017 | Pawlicki | |
| 9,600,768 B1 | 3/2017 | Ferguson | |
| 9,604,581 B2 | 3/2017 | Wierich | |
| 9,616,896 B1 | 4/2017 | Letwin | |
| 9,625,582 B2 | 4/2017 | Gruver | |
| 9,630,568 B2 | 4/2017 | Kuhn | |
| 9,637,053 B2 | 5/2017 | Schofield | |
| 9,637,118 B2 | 5/2017 | Yokota | |
| 9,639,951 B2 | 5/2017 | Salahat | |
| 9,643,605 B2 | 5/2017 | Pawlicki | |
| 9,665,780 B2 | 5/2017 | Kumano | |
| 9,669,827 B1 | 6/2017 | Ferguson | |
| 9,672,446 B1 | 6/2017 | Vallespi-Gonzalez | |
| 9,674,490 B2 | 6/2017 | Koravadi | |
| 9,696,722 B1 | 7/2017 | Ulrich | |
| 9,707,959 B2 | 7/2017 | Suzuki | |
| 9,719,801 B1 | 8/2017 | Ferguson | |
| 9,720,415 B2 | 8/2017 | Levinson | |
| 9,729,858 B2 | 8/2017 | Livyatan | |
| 9,731,653 B2 | 8/2017 | Lynam | |
| 9,736,435 B2 | 8/2017 | Schofield | |
| 9,740,205 B2 | 8/2017 | Ross | |
| 9,744,968 B2 | 8/2017 | Miyano | |
| 9,753,542 B2 | 9/2017 | Chizeck | |
| 9,772,496 B2 | 9/2017 | Kimura | |
| 9,776,568 B2 | 10/2017 | Hoyda | |
| 9,779,313 B2 | 10/2017 | Pliefke | |
| 9,785,150 B2 | 10/2017 | Sibenac | |
| 9,789,880 B2 | 10/2017 | Sweeney | |
| 9,823,353 B2 | 11/2017 | Eichenholz | |
| 9,834,153 B2 | 12/2017 | Gupta | |
| 9,834,216 B2 | 12/2017 | Pawlicki | |
| 9,840,256 B1 | 12/2017 | Valois | |
| 9,841,495 B2 | 12/2017 | Campbell | |
| 9,841,763 B1 | 12/2017 | Valois | |
| 9,857,468 B1 | 1/2018 | Eichenholz | |
| 9,869,753 B2 | 1/2018 | Eldada | |
| 9,869,754 B1 | 1/2018 | Campbell | |
| 9,870,512 B2 | 1/2018 | Rogan | |
| 9,874,635 B1 | 1/2018 | Eichenholz | |
| 9,880,263 B2 | 1/2018 | Droz | |
| 9,881,503 B1 | 1/2018 | Goldman-Shenhar | |
| 9,884,631 B2 | 2/2018 | James | |
| 9,897,687 B1 | 2/2018 | Campbell | |
| 9,902,311 B2 | 2/2018 | Sweeney | |
| 9,902,403 B2 | 2/2018 | Donnelly | |
| 9,904,375 B1 | 2/2018 | Donnelly | |
| 2002/0007119 A1 | 1/2002 | Pelissier | |
| 2002/0135468 A1 | 9/2002 | Bos et al. | |
| 2004/0030474 A1 | 2/2004 | Samuel | |
| 2004/0148093 A1 | 7/2004 | Tanaka | |
| 2005/0095092 A1 | 5/2005 | Segal | |
| 2005/0185845 A1 * | 8/2005 | Luo | G06K 9/00362 382/224 |
| 2005/0185846 A1 * | 8/2005 | Luo | G06K 9/00362 382/224 |
| 2005/0196015 A1 * | 9/2005 | Luo | G06K 9/00234 382/103 |
| 2005/0196035 A1 * | 9/2005 | Luo | G06K 9/00369 382/159 |
| 2005/0246065 A1 | 11/2005 | Richard | |
| 2006/0089765 A1 | 4/2006 | Pack | |

(56) References Cited

U.S. PATENT DOCUMENTS

| | | | |
|---|---|---|---|
| 2006/0140510 A1* | 6/2006 | Wallace | G06K 9/00362 382/294 |
| 2006/0155442 A1* | 7/2006 | Luo | G06K 9/00369 701/45 |
| 2006/0210146 A1* | 9/2006 | Gu | G01B 11/25 382/154 |
| 2006/0221072 A1 | 10/2006 | Se | |
| 2007/0107573 A1 | 5/2007 | Weusthof | |
| 2007/0171037 A1 | 7/2007 | Schofield | |
| 2007/0200064 A1* | 8/2007 | Remillard | G02B 23/12 250/330 |
| 2007/0219720 A1 | 9/2007 | Trepagnier | |
| 2007/0255480 A1 | 11/2007 | Southall | |
| 2008/0002427 A1 | 1/2008 | Kropac | |
| 2008/0039991 A1 | 2/2008 | May | |
| 2008/0051957 A1 | 2/2008 | Breed | |
| 2008/0055411 A1 | 3/2008 | Lee | |
| 2008/0161986 A1 | 7/2008 | Breed | |
| 2008/0215184 A1 | 9/2008 | Choi et al. | |
| 2008/0267454 A1 | 10/2008 | Kobayashi | |
| 2008/0304705 A1 | 12/2008 | Pomerleau | |
| 2009/0153665 A1 | 6/2009 | Linsenmaier | |
| 2009/0312906 A1 | 12/2009 | Bauer | |
| 2009/0319112 A1 | 12/2009 | Fregene | |
| 2010/0013615 A1 | 1/2010 | Hebert et al. | |
| 2010/0020306 A1 | 1/2010 | Hall | |
| 2010/0053715 A1 | 3/2010 | O'Neill | |
| 2010/0110192 A1* | 5/2010 | Johnston | H04N 5/2251 348/148 |
| 2010/0166294 A1* | 7/2010 | Marrion | G06K 9/00214 382/154 |
| 2010/0182406 A1 | 7/2010 | Benitez | |
| 2010/0185353 A1 | 7/2010 | Barwick | |
| 2010/0194890 A1* | 8/2010 | Weller | B60R 1/12 348/148 |
| 2010/0208034 A1* | 8/2010 | Chen | H04N 13/0239 348/46 |
| 2010/0208244 A1 | 8/2010 | Earhart | |
| 2010/0231715 A1 | 9/2010 | Garner | |
| 2010/0283781 A1* | 11/2010 | Kriveshko | G06T 17/00 345/419 |
| 2010/0283837 A1 | 11/2010 | Oohchida | |
| 2011/0000747 A1 | 1/2011 | Wu | |
| 2011/0050855 A1 | 3/2011 | Nobis et al. | |
| 2011/0134249 A1 | 6/2011 | Wood | |
| 2011/0166757 A1 | 7/2011 | Otanez | |
| 2011/0184605 A1 | 7/2011 | Neff | |
| 2011/0222757 A1* | 9/2011 | Yeatman, Jr. | H04N 13/239 382/154 |
| 2011/0234802 A1 | 9/2011 | Yamada | |
| 2011/0241845 A1 | 10/2011 | Sullivan | |
| 2011/0245964 A1 | 10/2011 | Sullivan | |
| 2011/0301786 A1* | 12/2011 | Allis | G05D 1/0038 701/2 |
| 2011/0317993 A1* | 12/2011 | Weissler | G02B 21/362 396/428 |
| 2012/0008129 A1 | 1/2012 | Lu | |
| 2012/0033196 A1 | 2/2012 | Vanek | |
| 2012/0083960 A1 | 4/2012 | Zhu | |
| 2012/0154785 A1 | 6/2012 | Gilliland | |
| 2012/0239238 A1 | 9/2012 | Harvey | |
| 2012/0293660 A1 | 11/2012 | Murakami | |
| 2013/0005414 A1 | 1/2013 | Gurbrinder et al. | |
| 2013/0041508 A1 | 2/2013 | Hu et al. | |
| 2013/0078063 A1 | 3/2013 | Shani | |
| 2013/0095920 A1* | 4/2013 | Patiejunas | G06T 15/00 463/31 |
| 2013/0123801 A1* | 5/2013 | Umasuthan | A61B 1/00149 606/130 |
| 2013/0156336 A1 | 6/2013 | Suk | |
| 2013/0166105 A1 | 6/2013 | Wastel | |
| 2013/0181983 A1* | 7/2013 | Kitamura | G01B 11/24 345/419 |
| 2013/0190963 A1 | 7/2013 | Kuss | |
| 2013/0197736 A1 | 8/2013 | Zhu | |
| 2013/0226431 A1 | 8/2013 | Lu | |
| 2013/0314503 A1 | 11/2013 | Nix | |
| 2013/0317649 A1 | 11/2013 | Larson | |
| 2014/0041966 A1 | 2/2014 | Healy | |
| 2014/0051465 A1 | 2/2014 | Ruys | |
| 2014/0063233 A1 | 3/2014 | Henion | |
| 2014/0067434 A1 | 3/2014 | Bourne et al. | |
| 2014/0071278 A1 | 3/2014 | Assaf | |
| 2014/0088855 A1 | 3/2014 | Ferguson | |
| 2014/0129951 A1 | 5/2014 | Amin et al. | |
| 2014/0136414 A1 | 5/2014 | Abhyanker | |
| 2014/0139669 A1 | 5/2014 | Petrillo | |
| 2014/0207342 A1 | 7/2014 | Chen et al. | |
| 2014/0210947 A1 | 7/2014 | Finn | |
| 2014/0267633 A1 | 9/2014 | Venkataraman | |
| 2014/0277691 A1 | 9/2014 | Jacobus | |
| 2014/0285666 A1 | 9/2014 | O'Connell | |
| 2014/0286744 A1 | 9/2014 | Shani | |
| 2014/0297116 A1 | 10/2014 | Anderson | |
| 2014/0327775 A1 | 11/2014 | Cho | |
| 2014/0347440 A1 | 11/2014 | Hatcher | |
| 2014/0358376 A1 | 12/2014 | Phelan | |
| 2014/0376119 A1 | 12/2014 | Sobecki | |
| 2015/0042640 A1 | 2/2015 | Algreatly | |
| 2015/0095235 A1 | 4/2015 | Dua | |
| 2015/0106900 A1 | 4/2015 | Pinski | |
| 2015/0109415 A1 | 4/2015 | Son | |
| 2015/0113622 A1 | 4/2015 | Dua | |
| 2015/0202939 A1 | 7/2015 | Stettner | |
| 2015/0253775 A1 | 9/2015 | Jacobus | |
| 2015/0269737 A1 | 9/2015 | Lam | |
| 2015/0293225 A1 | 10/2015 | Riley | |
| 2015/0312552 A1 | 10/2015 | Lu | |
| 2015/0334269 A1 | 11/2015 | Yokota | |
| 2015/0358540 A1 | 12/2015 | Kanter | |
| 2016/0003946 A1 | 1/2016 | Gilliland | |
| 2016/0129838 A1 | 5/2016 | Mingo | |
| 2016/0129917 A1 | 5/2016 | Gariepy | |
| 2016/0132705 A1 | 5/2016 | Kovarik | |
| 2016/0223671 A1 | 8/2016 | Thayer | |
| 2016/0224856 A1 | 8/2016 | Park | |
| 2016/0231746 A1 | 8/2016 | Hazelton et al. | |
| 2016/0291134 A1 | 10/2016 | Droz | |
| 2016/0318415 A1 | 11/2016 | Salasoo | |
| 2016/0349746 A1 | 12/2016 | Grau | |
| 2016/0379411 A1 | 12/2016 | Harbach | |
| 2017/0096138 A1 | 4/2017 | Reiff | |
| 2017/0168146 A1 | 6/2017 | Boehmke | |
| 2017/0184399 A1 | 6/2017 | Thayer | |
| 2017/0226765 A1 | 8/2017 | Wastel | |
| 2017/0254886 A1 | 9/2017 | Kyrtsos | |
| 2017/0344014 A1 | 11/2017 | Foster | |
| 2017/0357260 A1 | 12/2017 | Gilliland | |
| 2017/0366795 A1 | 12/2017 | Chou | |
| 2018/0007345 A1 | 1/2018 | Bougnoux | |
| 2018/0070804 A1* | 3/2018 | Tesar | A61B 17/02 |
| 2018/0149732 A1 | 5/2018 | Droz | |

FOREIGN PATENT DOCUMENTS

| | | |
|---|---|---|
| CN | 103152518 | 6/2013 |
| CN | 103179339 | 6/2013 |
| CN | 203353019 | 12/2013 |
| CN | 103001428 | 5/2015 |
| CN | 102857592 | 12/2015 |
| CN | 103146355 | 2/2016 |
| EP | 1816514 | 8/2007 |
| EP | 1816514 | 8/2017 |
| JP | H09163197 | 12/1998 |
| JP | H09326032 | 6/1999 |
| JP | 2011088623 | 4/2001 |
| JP | 2005024463 | 1/2005 |
| JP | 2011123078 | 12/2010 |
| JP | 2014-130552 | 6/2014 |
| KR | 10-2014-0124137 | 10/2014 |
| RU | 2493988 | 9/2013 |
| RU | 2012154453 | 6/2014 |
| RU | 2014146890 | 6/2016 |

(56) References Cited

FOREIGN PATENT DOCUMENTS

| WO | WO 2011/104706 | 9/2011 |
| WO | WO2012080741 A1 | 6/2012 |
| WO | PCT/JP2014/053408 | 3/2014 |

OTHER PUBLICATIONS

Office Action dated Jan. 16, 2017 in CA 2,902,430.
Office Action in CN201480022190.5 dated Aug. 22, 2017.
Office Action in CA2,902,430 dated Dec. 15, 2017.
Office Action in JP 2016-502343 dated Jan. 18, 2018.
International Search Report and Written Opinion in PCT/US2016/026799 dated Jul. 28, 2016.
International Search report in PCT/US2016/016858 dated May 19, 2016.
ISR and Written Opinion in PCT/US2018/023885 dated Aug. 16, 2018.
Office Action dated Sep. 26, 2018 in CN 201480022190.5.
Office Action dated Nov. 6, 2018 in CA 2,902,430.
Office Action in EP 14770009.0 dated Apr. 24, 2019.

\* cited by examiner

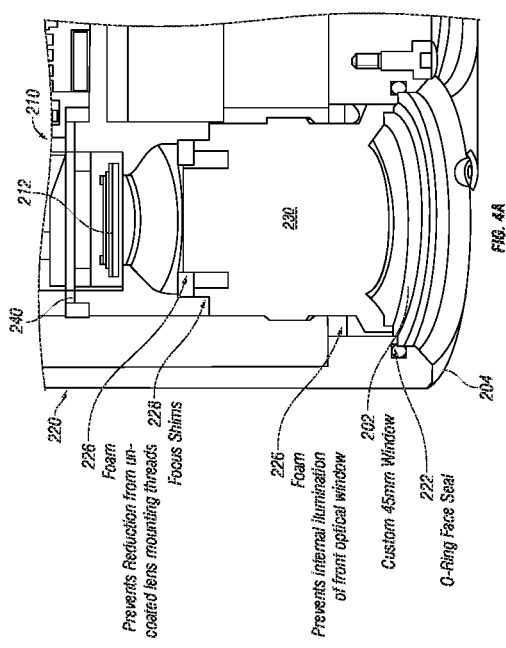

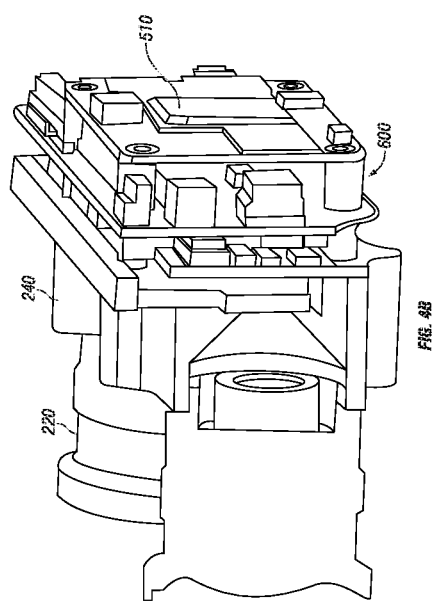

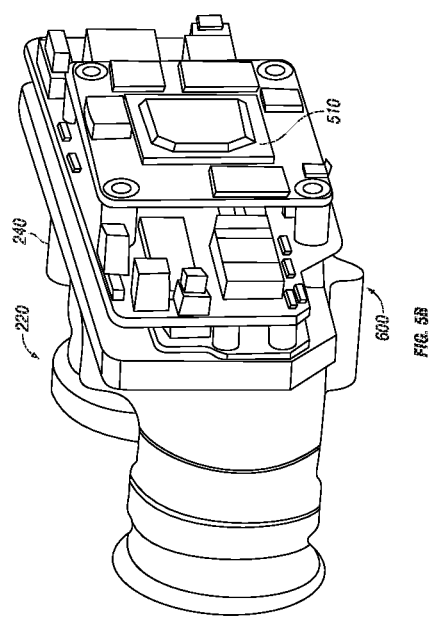

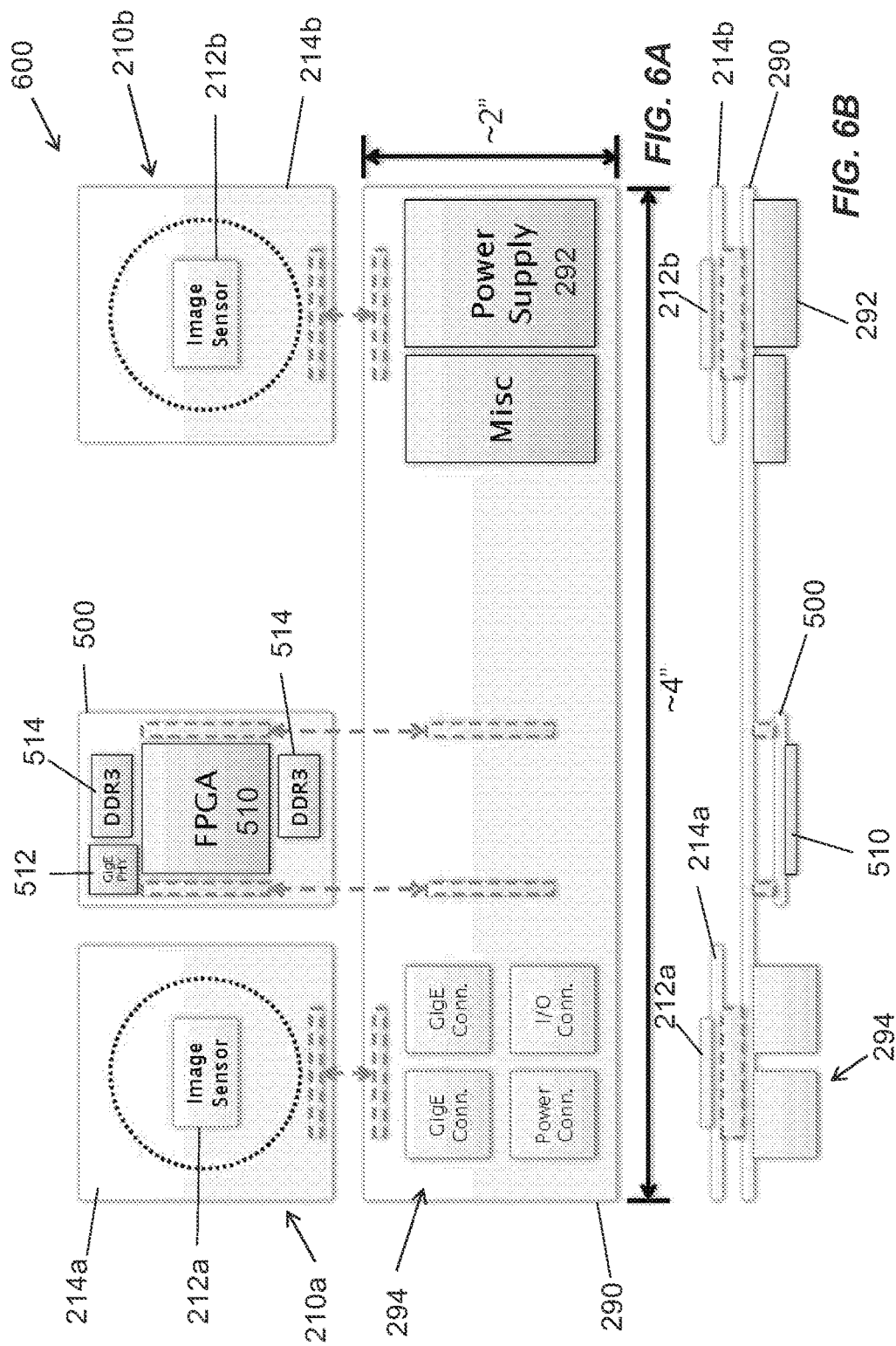

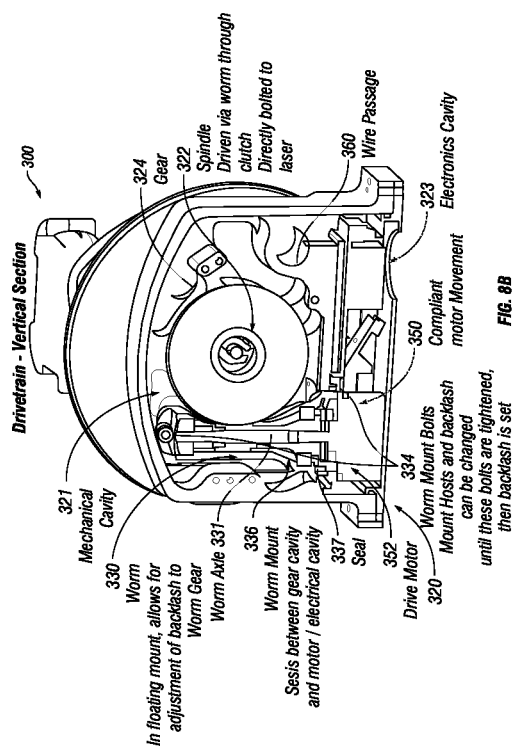

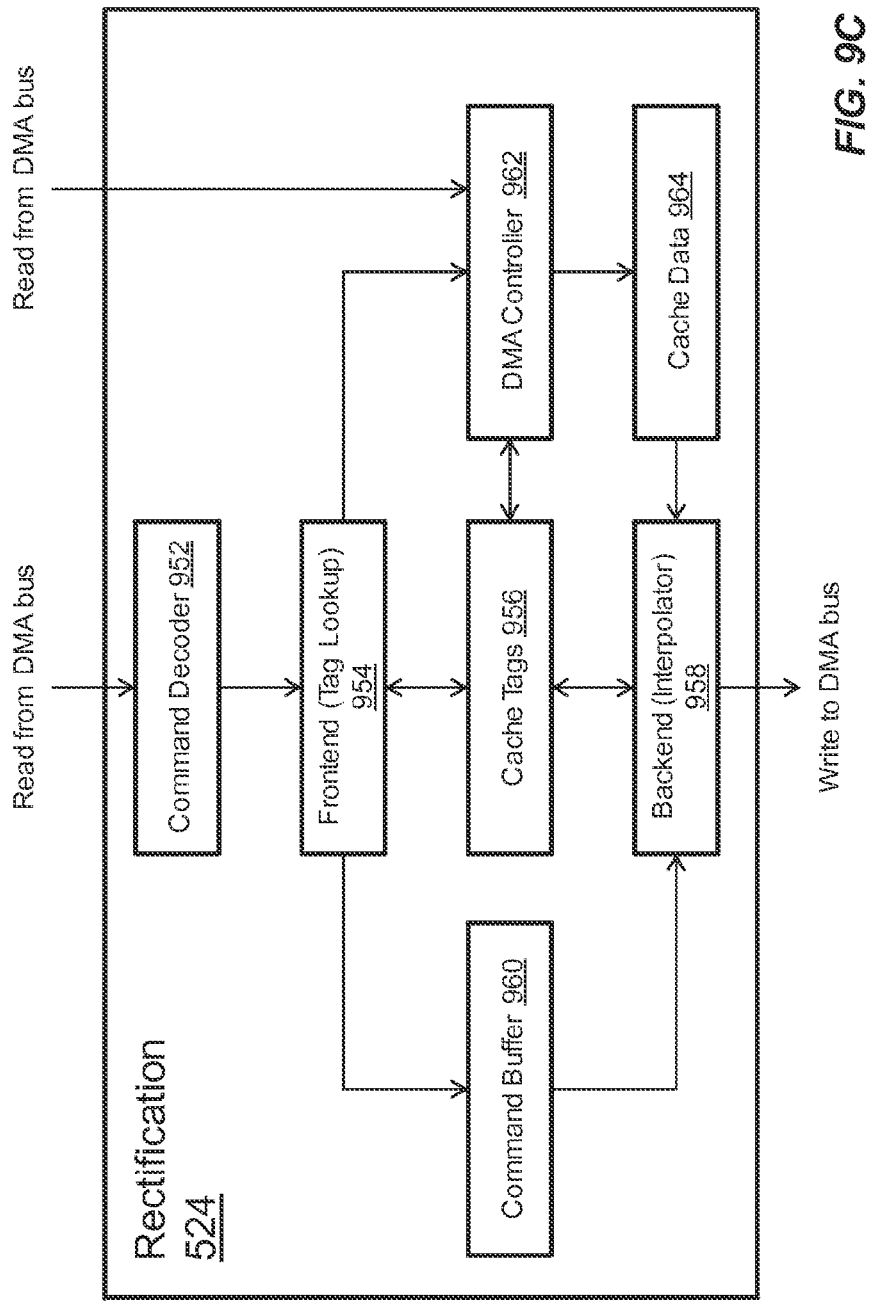

Stereo <> LIDAR Calibration 1200

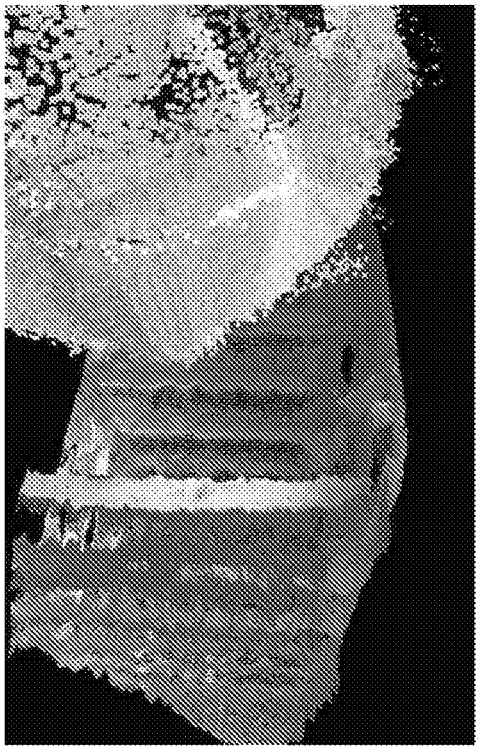
FIG. 18A No Smoke
FIG. 18B Smoke
Laser point cloud becomes corrupted with smoke while stereo data remains valid

METHODS, SYSTEMS, AND APPARATUS FOR MULTI-SENSORY STEREO VISION FOR ROBOTICS

CROSS-REFERENCE TO RELATED APPLICATION

This application claims priority, under 35 U.S.C. § 119(e), from U.S. Provisional Application No. 61/792,468, filed Mar. 15, 2013, and entitled "Methods, Systems, and Apparatus for Multi-Sensor Stereo Vision for Robotics," which application is hereby incorporated herein by reference in its entirety.

BACKGROUND

Three dimensional (3D) sensing is useful in many domains and environments. It allows robots, autonomous vehicles, and remotely operated vehicles to safely navigate and traverse terrain, avoiding static obstacles like trees, structures, and drop offs and dynamic obstacles like people, animals, and vehicles. 3D sensing also enables mapping of a robot's local environment and larger scale mapping of larger surrounding areas. In industrial environments, three-dimensional sensors described here can create static or adaptive safety curtains around machinery and/or count or inspect parts moving through an automated assembly or manufacturing lines.

High update rate stereo data can be used to sense near-field obstacles, targets, or objects to be interacted with. If mounted as the "head" of a humanoid robot, a stereo camera can perform the exact same role as human eyes do—building a real time 3D representation of the area before the humanoid allowing for reactive grasping, path planning, step planning, object recognition, object tracking, and many other forms of 3D computation.

SUMMARY

Embodiments of the present invention include combination stereo-vision/laser range-finding sensors suitable for use in robotics, navigation, machine vision, manufacturing, and other applications. In some cases, these sensors include stereo cameras with scanning lasers that provide video images, stereo images, and images derived from laser range measurements. These sensors can be used to calculate motion from which the laser images can be successively "stitched together" into a world map as the sensor moves with respect to its surroundings (or the surroundings change). In addition, the stereo camera and laser rangefinder can be used to "self-check" each other's range data. This allows the sensor to detect certain types of failures, and allows the sensor to self-calibrate in some circumstances.

The two sensors may have offsetting capabilities: the laser rangefinder may operate over long ranges (e.g., about 0.5 m to about 30 m) with high precision, have a fairly low data rate (e.g., about 43,000 points/second), and sense all or nearly all surfaces well, but may have some trouble imaging through airborne obscurants, such as dust. The stereo camera may be faster (e.g., more than 15,000,000 points/second), operate over a shorter range (e.g., about 0.5 m to about 5.0 m with a 7.0 cm baseline), perform better when imaging through airborne obscurants, but may not be able to sense range to featureless surfaces.

In some embodiments, the laser pulses are geometrically and temporally synchronized with each other and with an external clock. In addition, the laser pulses and camera images may be precisely timed relative to each other. This helps with calibration. It also enables construction of accurate 3D models using laser data even when the sensor is moving: motion estimates from the camera images enable compensation for sensor movement during the acquisition of laser rangefinder data points.

Embodiments of the sensor may include components integrated into a single unit built for environmental ruggedness, including thermal extremes, mechanical shock, vibration, and humidity. Specifically, the camera/lens design may be constructed to resist drifting out of calibration due to thermal changes and/or mechanical shock. Similarly, the stereo algorithms and control used to process sensor data may be tuned for operation in challenging environments of poor lighting and bad weather conditions, as well as dust and other particulates in air.

In certain implementations, including those suited for robotic use, the sensor may include or be operably coupled to an inertial measurement unit (IMU). A processor coupled to this IMU executes pose-estimation software to provide a pose solution to the robot for use in navigation, etc. This pose solution may be derived from data from the IMU, stereo (e.g., visual odometry), a wheel encoder, a Global Positioning Satellite (GPS) receiver, and/or the laser rangefinder.

In certain embodiments, a processor in or coupled to the sensor executes one or more calibration algorithms that enable the sensor unit to quickly assess the state of its calibration. If the unit detects that it is out of calibration (e.g., automatically), then it may readjust its calibration parameters to "fix" the calibration in a process known as "self-healing." The unit may notify the user about self-healing without requiring user intervention.

An exemplary sensor unit may calibrated (e.g., automatically) without targets. Usually camera and laser systems are calibrated with specific targets that are erected in the scene (e.g., on a tripod). For example, the system may detect one or more "good" targets of opportunity in the scene and automatically calibrate both the stereo camera and the laser rangefinder.

Embodiments of the present invention include systems and methods for estimating positions of one or more objects (including the system's own position) in an environment. In one example, the system includes a first imager, a second imager, and a processor operably coupled to the first and second imagers. In operation, the first imager acquires at least two reference images of the environment from a first perspective and the second imager acquires at least two comparative images of the environment from a second perspective. The processor synthesizes a first disparity map of the environment from a first reference image in the at least two reference images and a first comparative image in the at least two comparative images. The processor also synthesizes a second disparity map of the environment from a second reference image in the at least two reference images and a second comparative image in the at least two comparative images. The processor determines a first position estimate of the position of the object(s) based at least in part on the first disparity map and a second position estimate of the position of the object(s) based at least in part on the second disparity map.

In some cases, the processor can estimate a difference between the first position estimate and the second position estimate. The processor may also correct for the difference between the first position estimate and the second position estimate. For instance, the system may include a laser that illuminates the object with laser light and a sensor that detects laser light scattered and/or reflected by the object in order to provide a range signal representative of a distance to the object based on the detected laser light. The processor may determine the difference between the first position estimate and the second position estimate by comparing the range signal to the first position estimate, the second position estimate, or both the first and second position estimates.

Other embodiments of the present invention include systems and methods for imaging one or more features in an environment. An exemplary system includes a first imager, a second imager, and a processor operably coupled to the first and second imagers. In operation, the first imager acquires at least two reference images of the environment from a first perspective and the second imager acquires at least two comparative images of the environment from a second perspective. The processor synthesizes a first disparity map of the environment from a first reference image in the at least two reference images and a first comparative image in the at least two comparative images. The processor also synthesizes a second disparity map of the environment from a second reference image in the at least two reference images and a second comparative image in the at least two comparative images. The processor may identify a feature in the first disparity map and the second disparity map, and estimate a difference in appearance of the feature between the first disparity map and the second disparity map.

Embodiments of the present invention also include systems and methods for detecting misalignment of a scanning beam of laser light. An exemplary system includes a laser, a scanner in optical communication and/or mechanical association with the laser, a sensor, and a processor operably coupled to the sensor. In operation, the laser provides a laser beam, which the scanner scans so as to provide the scanning beam of laser light. The sensor detects laser light scattered and/or reflected by at least one object in the environment and to provide a first signal representative of a first measurement of the detected laser light and a second signal representative of a second measurement of the detected laser light. The processor generates a first representation of the environment based on the first signal and a second representation of the environment based on the second signal. The processor estimates at least one difference between the first representation and the second representation and determines a misalignment of the laser, the scanner, and/or the sensor based on the difference(s) between the first representation and the second representation. In some cases, the processor accounts for movement of the laser, the scanner, and/or the sensor between the first measurement and the second measurement in determining the misalignment.

In certain examples, the sensor comprises a stereo image sensor and the processor is configured to calibrate the stereo sensor based on the first representation and/or the second representation. In these examples, the processor can estimate a first three-dimensional position of the laser, the scanner, and/or the stereo image sensor based at least in part on the first representation. The processor can also determine a second three-dimensional position estimate of the laser, the scanner, and/or the stereo image sensor and estimate the difference based on the first three-dimensional position estimate and the second three-dimensional position estimate.

Another embodiment of the present invention includes a method of calibrating a multi-sensory stereo vision system comprising a stereo imager and a rangefinder. In one example, the method includes determining, from a disparity map provided by the stereo imager, a first three-dimensional position estimate of an object appearing in the disparity map using a suitable processor or other computing device. The processor also determines a second three-dimensional position estimate of the object from a measurement by the rangefinder. The processor determines a difference between the first three-dimensional position estimate and the second three-dimensional position estimate, e.g., by projecting coordinates of the second three-dimensional position estimate onto a volume defined by the disparity map and determining a distance between the coordinates of the second three-dimensional position estimate and coordinates of the first three-dimensional position estimate. The processor calibrates the multi-sensory stereo vision system based on the difference in the first and second three-dimensional position estimates.

In certain cases, the processor determines the first three-dimensional position estimate by obtaining a first two-dimensional image of a scene viewed from a first perspective by the stereo imager and a second two-dimensional image of the scene viewed from a second perspective by the stereo imager. The processor synthesizes the disparity map from the first two-dimensional image and the second two-dimensional image.

Some embodiments of the rangefinder include a laser rangefinder. In these embodiments, determining the second three-dimensional position estimate includes illuminating the object with laser light, detecting laser light scattered and/or reflected by the object, and determining the second three-dimensional position based at least in part on the detected laser light.

Yet another embodiment of the present invention includes a processing unit for producing a disparity map of an environment based on image data. An exemplary processing unit includes at least one interface to receive image data from at least two imagers; at least one rectification processing block, operably coupled to the at least one interface, to rectify the image data; and at least one stereo processing block, operably coupled to the at least one rectification processing block, to produce the disparity map based on the image data. In some cases, the rectification processing block and/or the stereo processing block are implemented in a field-programmable gate array.

For instance, the interface may include a first interface and a second interface. In operation, the first interface transforms a first serial representation of a first portion of the image data into a first parallel representation of the first portion of the image data. And the second interface transforms a second serial representation of a second portion of the image data into a second parallel representation of the second portion of the image data.

The stereo processing block may produce the disparity map according to a semi-global block matching (SGBM) algorithm, a semi-global matching (SGM) algorithm, and/or a stereo block matching algorithm. In some cases, the stereo processing block searches a dynamically reconfigurable portion of the disparity volume. The one stereo processing block can be dynamically reconfigured to process image data at different resolutions. The processing unit can also dynamically change a frame rate at which the at least two imagers acquire the image data.

In certain embodiments, the rectification block comprises at least one memory-to-memory block. This memory-to-memory block may include: a frontend, a delay line operably coupled to the frontend, and a backend operably coupled to the delay line. In operation, the frontend retrieves the image data from a memory. The delay line stores at least one image processing command for a period equal to or greater than a latency of the memory. And the backend produces a rectified output based at least in part on the image data retrieved from the memory.

Certain processing units may also include at least one pre-processing block, operably coupled to the interface, to pre-process a parallel representation of the image data. For instance, the pre-processing block may perform filtering, histogram generation, linearization, vignette correction, demosaicing, white balancing, and/or colorspace conversion of the parallel representation of the data.

Still further embodiments of the present invention include laser scanning systems and methods. An exemplary laser scanning system includes a laser, a spindle mechanically coupled to the laser, a gear to apply torque to the spindle, and a slipping clutch friction pad compressed between the gear and the spindle. In operation, the laser generates a laser beam. The spindle rotates the laser about a first axis so as to scan the laser beam. The gear applies torque to the spindle. And the slipping clutch friction pad conveys at least a portion of the torque applied by the gear to the spindle up to a threshold torque and allows the gear to slip with respect to the spindle at torques above the threshold torque. In some cases, the threshold torque remains constant as a function of temperature and force applied to the spindle.

The laser scanning system may also include a housing that contains at least a portion of the spindle, the gear, and the slipping clutch friction pad. In addition, the laser scanning system can also include an encoder, mechanically coupled to the spindle, that measures the spindle's position with respect to the housing. In some cases, the gear is a worm gear that is meshed with a worm, which drives the worm gear and is coupled to a motor, which in turn spins the worm so as to drive the worm gear. The laser scanning system may also include a compliant motor mount that is mechanically coupled to the motor to permit axial and radial movement of the motor. And the laser scanning system can include a slip ring mechanically coupled to the spindle and in electrical communication with the laser and a power source, in electrical communication with the laser via the slip ring, to power the laser.

Yet further embodiments of the present invention include stereo vision systems and methods. An exemplary stereo vision system includes a unitary frame, which defines at least one mounting surface and may consist of a single piece of material, a first imager mounted to the mounting surface, and a second imager mounted to the mounting surface. The stereo vision system may also include a processor operably coupled to the first imager and the second imager and a flexible cable that couples the second imager to the processor. The first and second imagers can be disposed in the same plane, parallel planes, or intersecting planes. The first and second imagers can be fastened to the mounting surface using one or more bolts and pins.

In operation, the first imager acquires a first image of an environment from a first perspective and the second imager acquires a second image of the environment from a second perspective different than the first perspective. The processor produces stereo image data from the first image and the second image.

Still another embodiment of the present invention includes sensor systems and methods. In one example, the sensor system includes at least one sensor, a housing that defines a cavity and at least one exterior surface, an internal wall inside the cavity and in thermal communication with the exterior surface, a processor disposed within the cavity and operably coupled to the at least one sensor, and thermally conductive material in thermal communication with the internal wall and the processor. The sensor provides sensor data, which the processor processes. And the thermally conductive material conducts heat generated by the processor to the exterior surface via the internal wall so as to dissipate the heat generated by the processor.

The sensor can also be disposed within the cavity and may include a first imager and second imager, both of which are mounted to a mounting surface, e.g., using pins and/or bolts. The first imager acquires a first image of an environment from a first perspective, and the second imager acquires a second image of the environment from a second perspective different than the first perspective.

In an alternative embodiment, the sensor system includes a sensor, a housing, and a processor. The housing defines a cavity and includes at least one wall defining at least one exterior surface. The processor is disposed within the cavity abutting the wall and is operably coupled to the sensor. In operation, the processor generates heat, which is dissipated via thermal conduction to the exterior surface via the wall.

An embodiment of the present invention includes stereo vision systems and methods. In one example, the stereo vision system includes a housing, a first sensor array disposed within the housing, a second sensor array disposed within the housing, and a light source disposed within the housing. In operation, the first sensor array acquires a first image of the environment from a first perspective via a first aperture in the housing and the second sensor array acquires a second image of the environment from a second perspective different than the first perspective via a second aperture in the housing. The light source illuminates an environment outside the housing via a third aperture in the housing. In some examples, the stereo vision system also includes a first lens, disposed in the first aperture and in optical communication with the first sensor array, to image a first portion of the environment onto the first sensor array and a second lens, disposed in the second aperture and in optical communication with the second sensor array, to image a second portion of the environment onto the second sensor array.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A and 4B are cutaway views of an optical component train and sensor assembly inside a stereo sensor head according to embodiments of the present invention.

FIGS. 5A-5D are perspective views of an optical assembly mated to an electronic assembly for use in a stereo sensor head according to embodiments of the present invention.

FIGS. 6A and 6B are plan and elevation views, respectively, of an electronics assembly for use in a stereo sensor head according to embodiments of the present invention.

FIGS. 8A-8D are drawings of a laser scanner and drivetrain according to embodiments of the present invention.

FIGS. 9A-9C illustrate a processor (e.g., a field-programmable gate array (FPGA)) configured to process stereo data using a global or semi-global block matching algorithm according to embodiments of the present invention.

FIGS. 18A and 18B show images synthesized from laser point cloud data and stereo image data with and without smoke obscuring the sensor, respectively.

DETAILED DESCRIPTION

To date, 3D stereo systems and 3D LIDAR systems have been too big, too heavy, and consume too much power for many applications. Embodiments of the present invention address these issues in a number of ways; in some examples, the result is a 3D sensor that is small enough, light enough, and low power enough to be employed on small robots, vehicles, humanoids, and other environments that have limits on sensor size, weight, and power consumption. Compared to conventional sensors, exemplary 3D sensing systems provide similar or extended sensing capabilities in a package that is nearly an order of magnitude smaller and that consumes nearly ten times less power. In some embodiments, the reduced power consumption and size is achieved through the use of an embedded FPGA, integrated mounting and structural frames, compact and efficient thermal design, and a compact, low-power, and self-protecting drive train.

Examples of the inventive sensors fuse LIDAR and stereo data into a single data stream that is especially useful in large area mapping. LIDAR data tends to be accurate but is sometimes not dense enough to stitch together without a continuous pose estimate of the laser's position in the environment. Stereo data tends to be dense enough and has enough frame-rate to provide a continuous pose estimate, either through visual odometry or 3D feature matching and tracking. Additionally, stereo data can be used to check and correct LIDAR data and vice versa, resulting in a more geometrically accurate, stable, and robust system than can exist as standalone devices.

Multi-Sensory Stereo Vision System

Figure 1A:
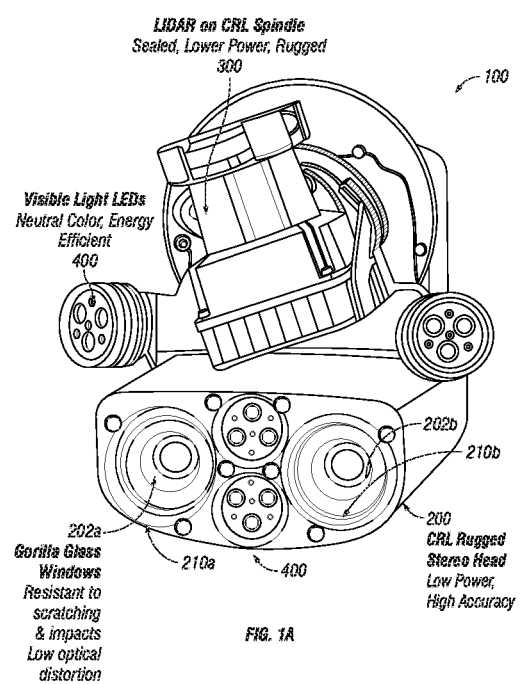
FIG. 1A shows a multi-sensory stereo vision system that includes stereo vision sensors mounted on a frame and a laser rangefinder mounted on a laser scanning apparatus according to embodiments of the present invention.
Figure 1B:
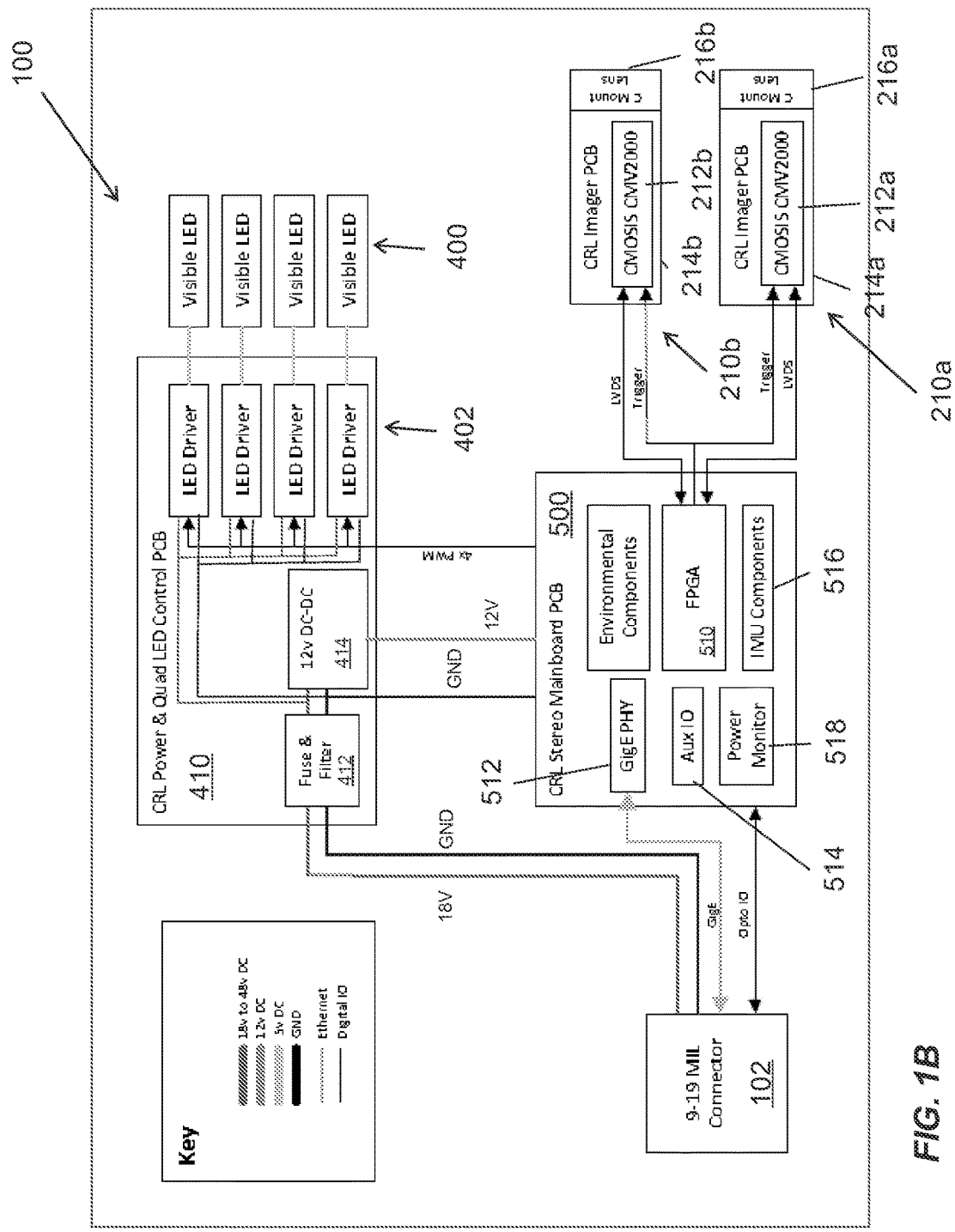
FIG. 1B is a block diagram of the multi-sensory stereo vision system shown in FIG. 1A according to embodiments of the present invention.

FIGS. 1A and 1B show an exemplary multi-sensory stereo vision system 100 that includes a stereo sensor head 200 mechanically coupled to a LIDAR via a compact, lightweight laser-scanning mechanism 300. The system 100 also includes visible and/or infrared (IR) light-emitting diodes (LEDs) 400. As shown in FIG. 1A, the stereo sensor head 200 includes cameras 210a and 210b (collectively, cameras 210) mounted behind respective windows 202a and 202b (collectively, windows 202). The stereo sensor head 200 also includes a pair of vertically mounted LEDs 400, each of which is mounted its own respective window.

FIG. 1B is a block diagram of the stereo vision system 100 shown in FIG. 1A. In addition to the cameras 210, the stereo vision system 100 also includes an LED driver module 410 and a processing module 500 operably coupled to each other directly via a suitable bus and also to one or more external components via a connector 102 or other suitable bus. The LED driver module 410 includes a fuse and filter 412 and a 12-Volt DC to DC converter 414 that together provide electrical power to the mainboard 500. A plurality of LED drivers 402 draw fused and filtered power to drive respective LEDs 400. The processing module 500 includes a processor 510, shown in FIG. 1B as a field-programmable gate array (FPGA), as well as memory (not shown), data connections 512, auxiliary inputs and outputs 514, and inertial measurement unit (IMU) components 516, and a power monitor 518. As readily understood by those skilled in the art, the processing module 500 also includes other components, such as an application-specific integrated circuit (ASIC) instead of or in addition to an FPGA.

FIG. 1B also shows that each camera 210 includes a respective imager 212a and 212b (collectively, imagers 212), such as CMOSIS CMV2000/4000 sensors; a respective imager printed circuit board (PCB) 214a and 214b (collectively, imager PCBs 214); and a respective window 216a and 216b (collectively, windows 216). The cameras 210 are operably coupled to the processor 510 in the processing unit 500 via respective trigger and signal lines as shown in FIG. 1B.

Stereo Camera Assembly

Pinning and Registering Printed Circuit Boards (PCBs) to Sensors and Optics (Unified Optical Frame/Subassembly)

One challenging aspect of making a stereo system is ensuring the accuracy of the calibration model over time. Any shifting of the lens or imager may cause optical distortion or shifting and the calibration model then no longer matches the characteristics of that unit. This results in difficulty in matching features from left to right images and loss of accuracy and completeness of the resulting disparity map.

Traditionally, stereo cameras have separately mounted cameras to a common housing. Alignment between these two cameras is thusly maintained by bolts, dowel pins, or both. Alignment within each camera of lens to imager is also maintained by bolts, dowel pins or both. At each of these locations there is the potential for an external shock to cause a shifting of components and loss of calibration accuracy.

Inventive stereo-camera sensor units incorporate a number of design measures to prevent shifting of the imagers or lenses. First, a single piece optical sub-frame is used instead of discrete component mounting. This means that both imagers and both lenses are directly mounted to a single machined component. This allows for more accurate initial mounting than traditional discrete mounting, and a more accurate alignment over time.

For example, the imagers are guaranteed to be in plane with each other, as they directly bolt to a single surface of the optical sub-frame. Traditional discrete mounting allows for one imager to be forward or rearward of the other, or slanted at a slight angle. Although these kinds of mounting errors can be factored into the system's calibration model and their effects removed from the resulting data, it may be better to have accurate lens and imager alignment.

Additionally, the optical sub-frame maintains calibration accuracy over time better than discrete mounting. This is due to the reduction in number of bolts or dowel pins between lens and imager and left and right lens/imager pairs. As the number of connections drops, the system becomes sturdier, and mounting and alignment is more stable over time.

Figure 2A:
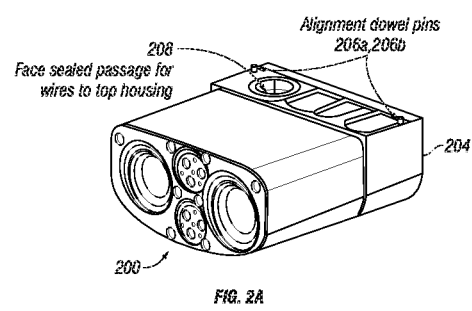
FIG. 2A is a perspective drawing of a stereo sensor head that shows dowel pins for aligning the stereo sensor head with a laser rangefinder and/or other components of a multi-sensory stereo vision system according to embodiments of the present invention.

FIG. 2A is a perspective view of the stereo sensor head 200 and shows the sensor heads outer housing 204 which can be made of plastic, metal, or any other suitable material. The housing 204 can be molded or machined from a single piece of material or formed from multiple pieces. The housing 204 includes dowel pins 206a and 206b (collectively, dowel pins 206) that fit into receptacles (not shown) on the laser-scanning mechanism 300 and/or other features for aligning the stereo sensor head 200 to the laser-scanning mechanism 300 (FIG. 1A). The housing 204 may also define a sealed passage 208 or other aperture for running cabling from the sensor head 200 to an external power supply, processor, memory, antenna, communication interface, or other electrical and/or mechanical component.

Figure 2B:
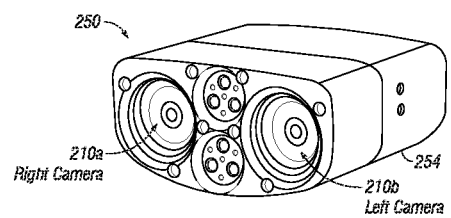
FIGS. 2B and 2C are perspective drawings of a stereo sensor head that does not include alignment dowel pins or other attachments for a laser assembly according to embodiments of the present invention.
Figure 2C:
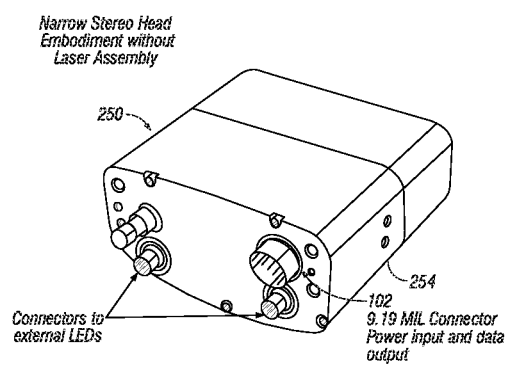

FIGS. 2B and 2C shows views of a stereo sensor head 250 that does not include alignment dowel pins or other attachments for a laser assembly. Like the stereo sensor head 200 shown in FIG. 2A, the stereo sensor head 250 includes a housing 254 that can be molded or machined from a single piece of material or formed from multiple pieces. When assembled, the housing 254 defines a cavity to hold cameras 210 and associated electronics (not shown) and apertures for the cameras 210, lights, power/data connectors 102, and LED connectors.

Figure 7A:
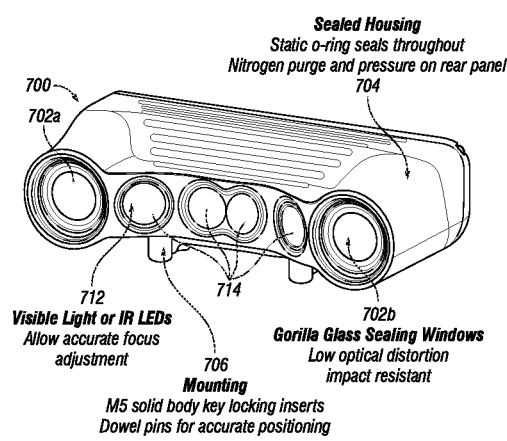
FIGS. 7A and 7B are perspective and cutaway views, respectively, of an alternative stereo sensor head suitable for use in a multi-sensory stereo vision system according to embodiments of the present invention.
Figure 7B:
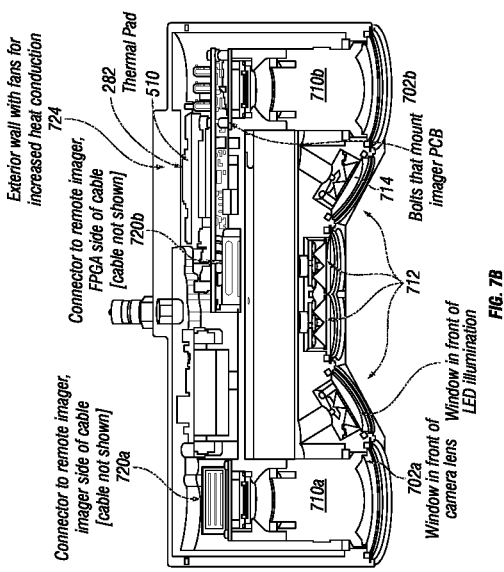

FIGS. 7A and 7B show an alternative stereo vision system 700 with a wider housing 704 than the housing 204 shown in FIG. 2A. The housing 704 may be sealed with static O-rings, a nitrogen purge valve, and/or a pressure valve on its rear panel. The housing 704 includes mounts 706 with solid-body key-locking inserts (also visible on the left and right rear edges of the narrower housing 204 in FIG. 2C) and dowel pins for accurate positioning. This housing 704 also includes a pair of windows 702a and 702b (collectively, windows 702) for respective cameras 710a and 710b (collectively, cameras 710). These cameras 710 can be coupled to a processor via one or more flexible ribbon cables that connect to connectors 720a and 720b. As in the other examples, the windows 702 can be made of impact-resistant glass or plastic with low optical distortion. In this case, however, the windows 702 and cameras 710 are more widely separated to provide a wider baseline, which in turn improves 3D depth accuracy and increases the useable range. In addition, the housing 700 contains four LED arrays 712 behind respective windows 714 distributed horizontally between the cameras 710. These LED arrays 712 may provide visible illumination, IR illumination, or a combination of visible and IR illumination for improved imaging fidelity and accurate focus adjustment.

Thermally Conductive Pads to Conduct Heat from Field Programmable Gate Arrays

The system's largest heat generator is the processor 510, which may include a main processing field-programmable gate array (FPGA) or application-specific integrated circuit (ASIC). If not properly cooled, the processor 510 can overheat and suffer physical damage if the system is operated at elevated ambient temperatures. Since the processor 510 is inside a sealed housing, removing heat from the processor 510 can be challenging.

Figure 3A:
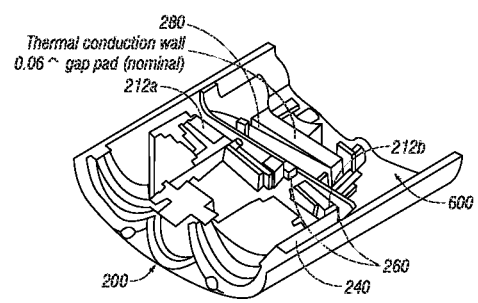
FIGS. 3A-3D are cutaway drawings of a stereo sensor head with a unitary frame, separate apertures and lenses for light sources and stereo cameras, an internal thermal conduction wall, and a thermally conductive pad to wick heat away from the electronics according to embodiments of the present invention.
Figure 3B:
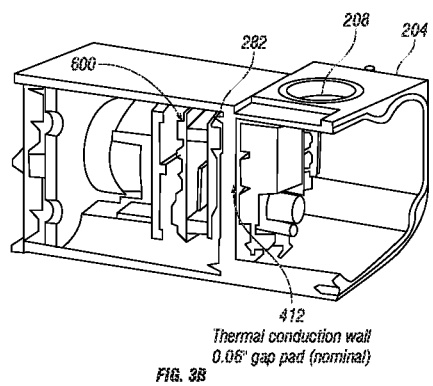
Figure 3C:
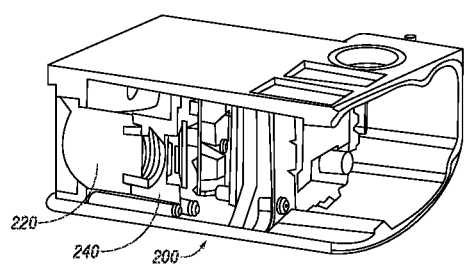
Figure 3D:
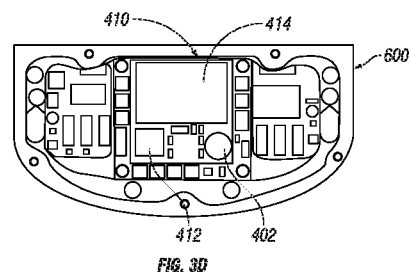
Figure 5A:
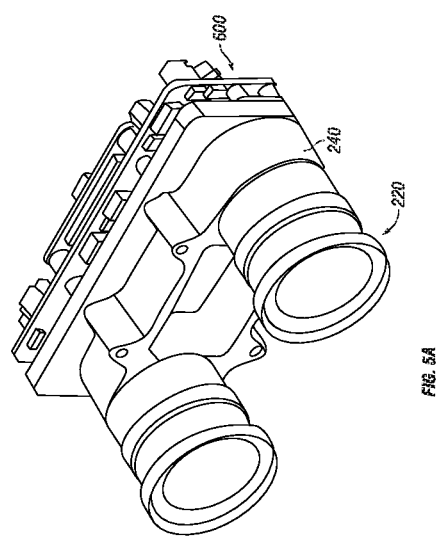
Figure 5C:
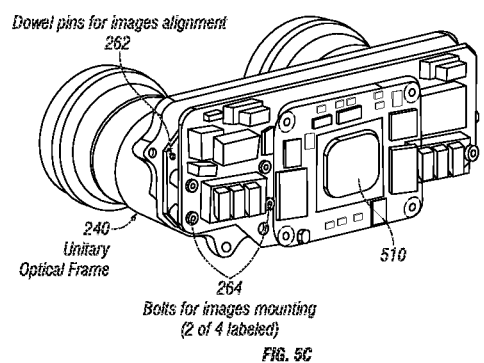
Figure 5D:
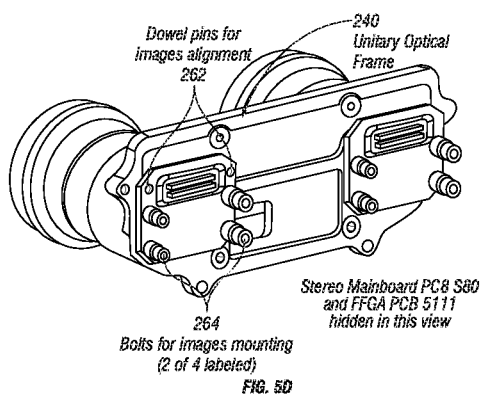

FIGS. 3A-3D show cutaway views of the sensor head 200. These views show an electronics assembly 600 (shown in greater detail in FIGS. 6A and 6B) that includes the processing unit 500, the imagers 212, and imager PCBs 214. As shown in FIGS. 3A and 3C, a unitary frame 240 holds the imagers 212 in place with respective their respective optics (lens(es) 230 shown in FIG. 4A). The unitary frame 240 can be machined, molded, or otherwise fabricated from a single piece of material (e.g., a piece of plastic or metal) with a relatively low coefficient of thermal expansion to ensure that the imagers 212 remain aligned with respect to each other in order to prevent temperature fluctuations from affecting stereo imaging precision. The frame 240 can have discrete in-plane mounting surfaces 260 or a single continuous mounting surface that the imager 212 and their attached PCBs 214 are bolted to. Bolting and pinning the imager 212 and imager PCBs 214 to the in-plane mounting features 260 on the single unitary frame 240 improves the mounting accuracy and mounting stability of the imagers 212, which results in higher quality 3D data as the system's calibration is more accurate over time. In certain embodiments, the electronics assembly 600 is mounted directly to the unitary frame 240 for greater alignment precision between the imagers 212 and the optics.

FIGS. 3A-3D also show a thermally conductive pad 282 between the processor 510 (e.g., an ASIC or FPGA) and a thermal conduction wall 280 that is integrated into the housing 204. This interior wall 280 is not directly exposed to the outside environment, but is part of the housing 204, which has many exterior faces. As such, heat from the processor 510 passes through the pad 282, heating the interior wall 280. Heat flows through that wall 280 to the rest of housing 204, which dissipates the heat via its many external faces to the outside world. In some cases, the external wall may include one or more fins 724 (FIG. 7B) for increased heat dissipation. Overall, this design creates a thermal path with low impedance between a heat source (e.g., the processor 510) and the outside world. It does not require any active cooling measure like a fan, and it maintains the seal integrity of the system. In other embodiments, the housing 204 may be configured such that the processor 510 abuts an exterior wall, reducing the length of the thermal path between the processor 510 and the external air.

Optical Assembly for Stereo Vision

FIGS. 4A, 4B, and 5A-5D show various views an optical assembly 220 for one of the cameras 210 in the stereo sensor 200. As shown in FIG. 4A, the optical subassembly optics 220 comprises one or more lenses 230 and/or other optical elements for imaging the scene onto the imager 212. The optical subassembly 220 also includes a custom window 202 that is positioned with respect to the housing 204 using an O-ring seal 222. Foam 226 blocks light and prevents reflections that can reduce image quality and focus shims 228 keep the lenses 230 in place with respect to the housing 204 and the imager 212. Dowel pins 262 align each imager 212 to the unitary frame 240, and bolts 264 fasten the imagers 212 to the unitary frame 240.

Separate Windows for Lights and Sensor Lenses

As shown in FIGS. 7A and 7B, the stereo sensor head 700 may have separate optical windows for imager optics and system illumination. Outgoing illumination may be partially reflected from the window into the cavity that holds the light source (e.g., light-emitting diode) or absorbed by the window itself. The illumination lost inside the windows lights up dust, water, dirt, or any other debris—even debris linearly offset from the beam exit location. Thusly, illumination behind the same window as imaging optics lights up debris in the field of view of the system lenses, which may cause more scene interference than unlit debris. To prevent lost illumination from degrading image quality, the system employs separate windows in front of lenses and illumination.

The windows 714 in front of the illumination sources (LEDs 712) can be frosted to diffuse the lighting to a degree. Frosting lessens the sharpness of shadows and causes the emitted light to be softer and less harsh, and reduces "hot spots" in the light distribution. This diffuse light can make it easier for the stereo algorithm to match features from left to right by providing more uniform illumination and reducing shadows.

Lighting

The field of view of the system's illumination closely matches the field of view of the lenses and imagers. This means that the system does not waste power lighting portions of the scene that are not optically visible to the user or the stereo camera. As a result, system power efficiency is higher.

The system can include sources that provide visible illumination, infrared illumination, or both visible and IR illumination. The imagers are IR sensitive, and the option for IR illumination allows the system to operate at night without visible lighting.

Separable Imager Board Enabling Various Baselines

FIGS. 6A and 6B show the electronics assembly 600 in greater detail. The electronics assembly 600 includes the image sensor arrays 212, the image sensor PCBs 214, and the processing unit 500. These components are mechanically, thermally, and electrically coupled to a main logic PCB 290, which also supports a power supply 292 that provides power to the active electronic components and various data and power connections 294. As shown in FIG. 6A, the PCB 290 can be relatively small, with a length of about 4 inches and a height of about 2 inches.

The imager printed circuit boards (PCBs) are separate from the main logic PCB 290 and the processor PCB (processing module) 500, which allows for tighter system packing as well as easier adaptation to new system baselines (geometries). Instead of an imager PCB 214 directly plugging into the main logic PCB 290, as shown in FIGS. 6A and 6B, one or both imager PCBs 214 can be connected to the main logic PCB 290 via a flexible ribbon cable or other suitable flexible, expandable, or extendable connector. For example, FIG. 7B shows connectors 720a and 720b for coupling imagers (not labeled) to the main logic PCB 298 via a flexible ribbon cable. These cables can be built in various lengths, allowing for system baselines to change from several inches to several feet (e.g., 6-10 feet). The processor logic 500 changes slightly depending on the electrical length difference between the processor 510 and the left and right cameras 210. To account for the electrical length difference, the processor 510 may send the trigger signal for the farther camera (e.g., camera 210a) slightly before (e.g., several nanoseconds before) sending the trigger signal to the nearer camera (e.g., camera 210B) such that the cameras 210 receive the respective trigger signals at the same time. Additionally, clock recovery logic on the processor (FPGA) 510 may be similarly modified to compensate for the clock offsets between left and right cameras 210. The imagers 212 can also be mounted directly on the main logic PCB 290 without use of flexible cables and/or dedicated imager PCBs in stereo heads with baselines wide enough to support such an arrangement.

Laser Rangefinder and Laser Scanning Mechanism

FIGS. 8A-8D show a compact, light laser-scanning mechanism 300 that operates with low power draw (e.g., about 2 Watts to about 15 Watts), low rotation speed (e.g., 0 to 60 rpm), and low spindle backlash (e.g., about 0.1 degree to about 0.5 degree). In operation, the laser-scanning mechanism 300 oscillates or continuously rotates a laser 310 about a first axis 3 so as to sweep or scan the planar laser beam (e.g. of up to about 180 or 270 degrees) emitted from the laser 310 to create a partial sphere of 3D ranges from a normally 2D laser range sensor. The laser beam may be at an eye-safe wavelength (e.g., a wavelength in the near-infrared portion of the spectrum, such as 950 nm) at a power high enough to generate a reliably detectable return without creating a hazard. The spot size and beam divergence angle can be selected to ensure accurate ranging as understood in the art of optics.

The laser-scanning mechanism 300 includes a first seal 380 between the outside world and a mechanism cavity 321 and a second seal 337 between the mechanism cavity 321 and an electronics cavity 323. It also provides continuous spindle rotation with an electrical pass through (wire passage 360 in FIG. 8B). The scanning mechanism 300 and its geartrain are protected from external loads, especially shocks or impacts which can damage small gear teeth.

In one embodiment, the scanning mechanism 300 includes single-stage worm reduction gearing. Due to the high mechanical reduction in a single mesh (e.g., 50:1), low backlash can be obtained. A floating worm 330 provides improved backlash, which is the degree of play between parts of a mechanism, over a standard worm drivetrain because it allows for adjustment of the gear positions before the assembly is bolted in place. This floating worm 330 comprises a subassembly 332 with motor 352, worm axle 331, sealed bearings 340, and a housing 370 containing the subassembly 332 and other components. The subassembly 332 is installed into the sensor unit and its worm 330 meshed with a large worm gear 324. Backlash can be adjusted by small movements of the subassembly 332 left and right, up and down. Once backlash is reduced or minimized, the subassembly 332 is locked into place with one or more worm mount bolts 334.

The scanning mechanism 300 includes a compliant motor mount 350, two bearings on the axle 331 and two bearings on the motor shaft, which is pressed into the axle 331. In operation, the compliant motor mount 350 prevents over-constraining of the axle 331. This compliant motor mount 350 allows the motor and motor shaft to move axially and radially, while resisting rotation and allowing torque to be conveyed to the worm axle 331. The compliant motor mount 350 can be made of steel, plastic, or any other suitable material.

To maintain a seal between the mechanical cavity 321, which contains the worm 330 and worm gear 324, and electronics cavity 323, which contains the motor 352, the scanning mechanism 300 includes: sealed bearings on the main spindle 322; sealed bearings on the floating worm subassembly 332; and a static bore seal designed into the floating worm housing 336, sealing to the main housing 370 while still allowing the floating worm assembly 332 to be moved slightly to allow backlash adjustment. In addition, a slip ring 326 is embedded into the system's hollow spindle 322 to enable continuous mechanical rotation with electrical pass through.

A slipping clutch 325 in the worm gear 324 protects the worm gear's teeth and the worm's teeth from mechanical damage in case of external torsional impact or shock loads. The slipping clutch 325 includes a friction pad 328 that is sandwiched between the spindle 322 and the worm gear 330, one or more springs 388 that press the worm gear 324 into the friction pad 328, and a series of spacers (shim stack 386) and bearings that compress the spring(s) 388. The friction pad 328 can be made of fiberglass, G10 Garolite, brake pad material, or any other material that exhibits high friction, little to no compressibility, high surface durability, and strength (to prevent wear). Rotational loads less than the rotational drag between the worm gear 324, friction pad 328, and spindle 322 are conveyed through this system as though all pieces were rigidly bolted together. But larger rotational loads cause the worm gear 324 to start slipping with respect to the spindle 322 and thusly the worm 330 and worm gear teeth are not exposed to high loads, even shock loads. This slipping clutch operates when the system is undergoing powered movement and when the system is powered off. Once the high load condition is removed, the geartrain resumes normal rotation as though no event has occurred—no components need to be replaced, reset, or repaired.

Figure 8A:
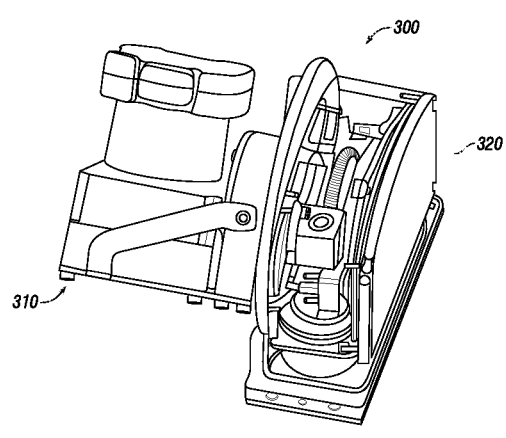
Figure 8C:
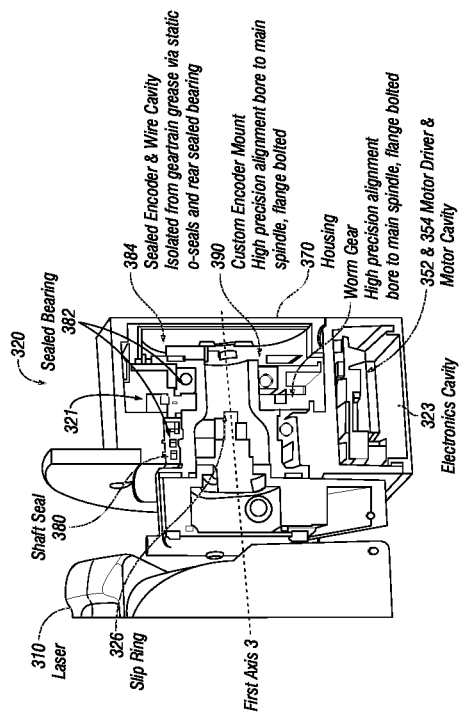
Figure 8D:
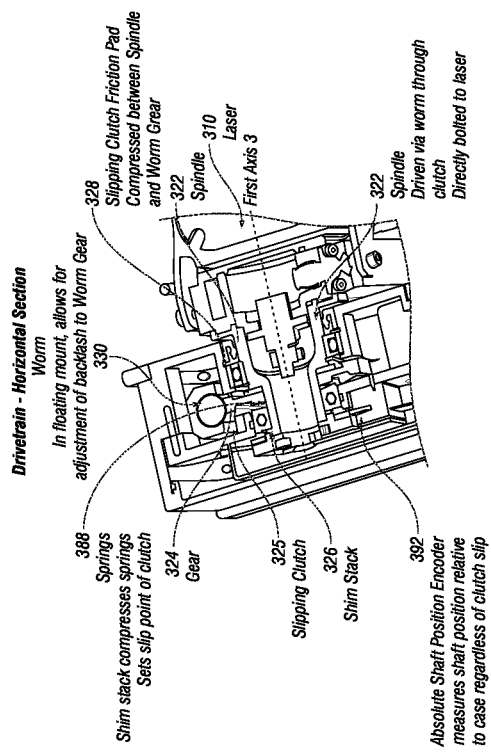

FIGS. 8C and 8D show that the drivetrain may also include a encoder mount 390 and an absolute shaft position encoder 392 for measuring the spindle location in order to accurately project laser data into 3D space. The custom encoder mount 390 comprises a flange that is bolted and aligned to the spindle 322. The absolute shaft position encoder 392 comprises a perforated or marked ring that is sandwiched between the custom encoder mount 390 and the spindle 322. In operation, a photodiode or other sensor senses the marking on the absolute shaft position encoder 392 to provide an indication of the spindle's angular position.

Processor Implementation

Figure 9A:
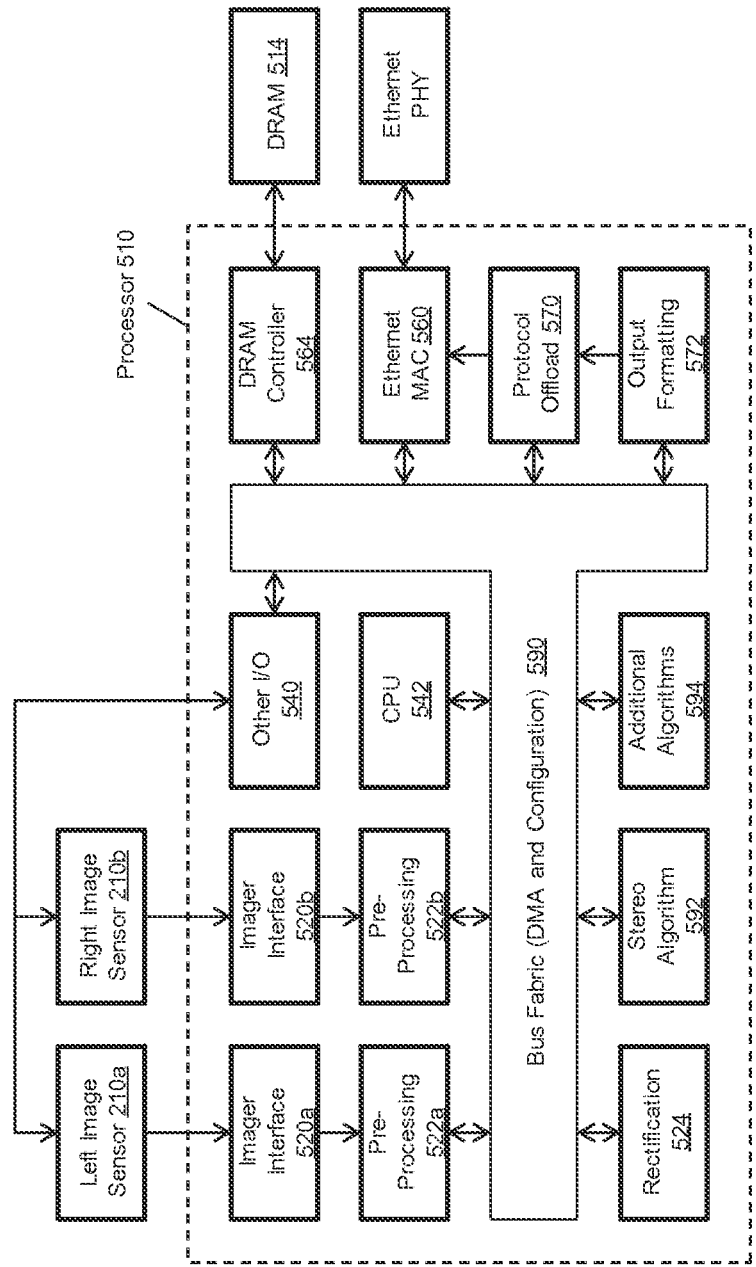
Figure 9B:
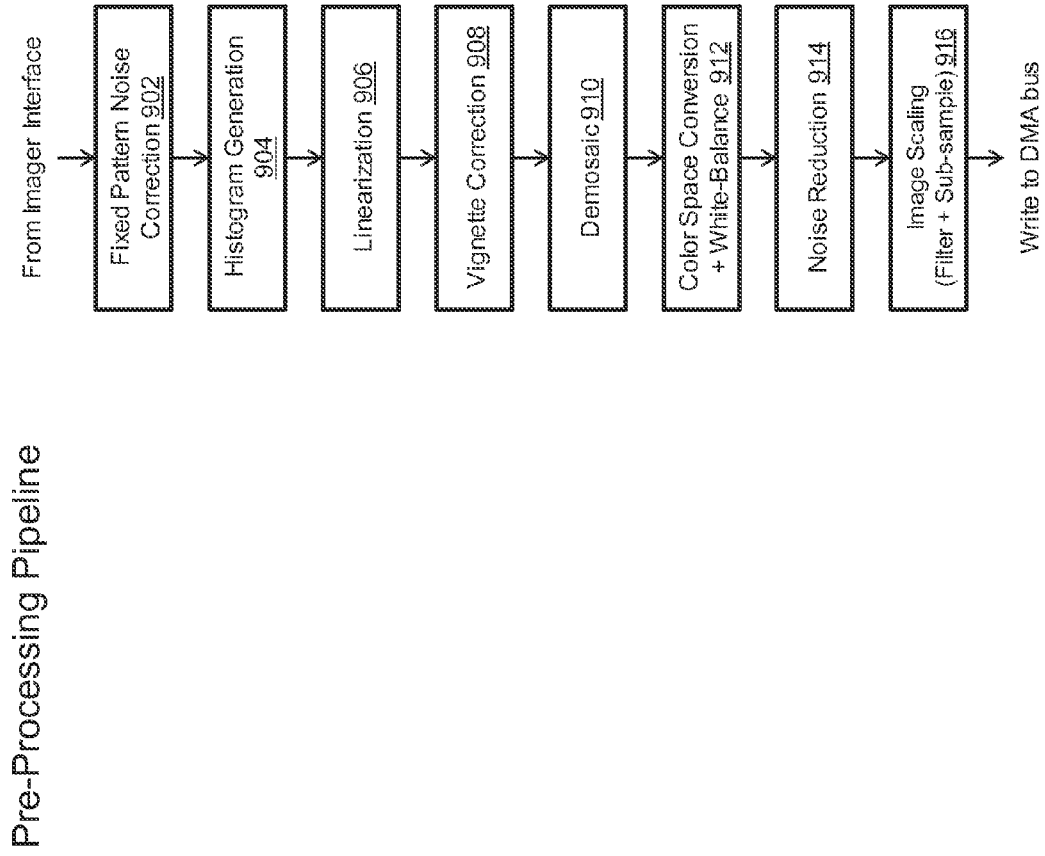

FIGS. 9A-9C illustrate an implementation of the processor 510 using an FPGA or ASIC suitable for use in inventive sensor units. This processor implementation includes one or more imager interfaces 520*a* and 520*b* (collectively, interfaces 520) to the image sensors 210 for the stereo camera 200. Pre-processing blocks 522*a* and 522*b* (collectively, pre-processing blocks 522) receive serialized data over low-voltage differential signaling (LVDS) lines from the image sensors 210 and convert the serialized data to a standard parallel representation for the rest of the processing pipeline. The imager interfaces 520 perform dynamic clock/data alignment. They are also responsible for locking to a known format of incoming serial data and detecting errors in the serialized data.

As illustrated in FIG. 9B, the pre-processing blocks 522 may also be configured to perform any one of a variety of pre-processing tasks, including but not limited to:
- de-noise: remove fixed-pattern noise (block 902) and filter out random noise (block 914);
- histogram generation for clipping, black-level detection, auto-exposure, auto-gain, etc. (block 904);
- linearization: convert from high-dynamic range (HDR) space (if HDR imaging is enabled) to linear intensity space (block 906);
- vignette correction: correct for dim edges/corners of image caused by lenses (e.g., based on data stored in a lookup-table) (block 908);
- demosaic: convert a Bayer color image into a full color image, e.g., using the "Interpolation using a Threshold-based variable number of gradients" algorithm (VNG): http://scien.stanford.edu/pages/labsite/1999/psych221/projects/99/tingchen/algodep/vargra.html (incorporated herein by reference in its entirety) (block 910);
- colorspace conversion: convert sensor's RGB colorspace into a standard colorspace for pipeline usage (e.g., RGB or CIELAB) (block 912);
- white-balance: adjust color to match scene illumination (block 912); and
- filtering/sub-sampling: reduce image resolution by smoothing and then sub-sampling (e.g., if the user requests lower than maximum resolution) (block 916).

As shown in FIG. 9C, the processor 510 may also perform rectification on the data from the cameras 210, e.g., using a separate rectification block for each camera or a single pure memory-to-memory block 524 shared by the left and right stereo cameras. This rectification memory-to-memory block 524 may have its own connection to a direct memory access (DMA) bus 590 (pre-processing may also connect directly to the DMA bus). To save processor resources, a single rectification block 524 is shared between both the left and right image paths.

The rectification module 524 transforms image data to remove any distortion introduced by the lenses. A packed command stream is used to efficiently encode the input pixel coordinates as a sequence of relative coordinates interspersed with a small number of absolute coordinates. The command decoder 952 reads this command stream from memory 514 via the DMA bus 590 and decodes it into a sequence of purely absolute pixel coordinates. Other embodiments may dynamically generate coordinates directly from calibration parameters, in order to save memory bandwidth by removing the command stream, and to allow for tweaking calibration without having to regenerate the entire command stream (which is an expensive process).

The rectification module 524 implementation shown in FIG. 9C uses bilinear interpolation to sample the source image, and relies on caching to improve memory access efficiency. A multi-bank cache 964 allows all four input pixels (as required for bilinear interpolation) to be read simultaneously. The design is fully pipelined and can sustain a throughput of nearly 1 pixel/cycle. A delay-line between cache tag lookup and cache data read allows for cache misses to be resolved before the data is actually needed.

In some embodiments, the delay line may be a first in, first out (FIFO) command buffer 960 disposed between a frontend 954 and a backend 958 of the rectification block 524. The frontend 954 receives pixel coordinates from a command decoder 952, determines the input pixels for a given output pixel, and then checks the rectification block's cache tags 956 to determine if those input pixels are already in the rectification block's cache 964. (The cache tags 956 track what is currently in the cache 964, so that: 1) the frontend 954 knows what requests to send to the DMA controller 962; 2) the DMA controller 962 knows when there are no more outstanding commands that reference a particular cache entry, so it can safely overwrite that entry; 3) the backend 958 knows when the DMA controller 962 has finished fetching a new entry into the cache 964.) If those input pixels are not in the rectification block's cache, the frontend 954 instructs the DMA controller 962 to issue one or more read requests to main memory (514) to fetch the missing pixel(s) via the DMA bus 590. The backend 958 uses the input pixels (four of them for bilinear sampling) to produce an output pixel. Since main memory may be slow (e.g., it may have a latency of more than 100 cycles), and stalling the backend 958 may undesirable (e.g., because the desired average throughput may be close to 1 pixel/cycle to keep the pipeline moving smoothly), it may be desirable to hide the latency associated with fetching missing pixels from the main memory.

In some implementations, rectification is a highly sequential process, without branching or inter-pixel dependencies, so hiding memory latency can be accomplished by delaying the commands going from the frontend to the backend. For instance, the commands can be delayed using the delay line (FIFO buffer 960) for a period equal to or greater than the worst-case memory latency to provide reasonable certainty that the memory read(s) are completed before the backend needs the new data.

The processor 510 also implements a suitable stereo processing algorithm using stereo algorithm block 592 to transform the pre-processed, rectified data from the cameras into stereo images. For instance, the processor 510 may implement the Stereo Block-Matching (StereoBM) algorithm using an open-source core (see, e.g., http://danstrother.com/2011/06/10/fpga-stereo-vision-core-released/, which is incorporated herein by reference in its entirety). It may also implement the Semi-Global Block Matching (SGBM) algorithm, the Semi-Global Matching (SGM) algorithm (see, e.g., http://www.dlr.de/rm/en/PortalData/3/Resources/papers/modeler/cvpr05hh.pdf, which is incorporated herein by reference in its entirety), or any other suitable stereo algorithm.

In some cases, the stereo processing block 592 can be dynamically reconfigured to allow it to process different resolution image inputs (as desired or necessary to handle the unsealed or scaled images being produced by the pre-processing pipeline shown in FIG. 9B). Higher resolution inputs yield more 3D points and higher depth accuracy, but require more processing. The stereo processing block 592 can also be dynamically reconfigured to search different disparity ranges (volumes). A larger disparity search range can result in greater depth range, but requires more processing. The stereo processing block 592 can account for independently adjusted image width, image height, and disparity search range. Being able to dynamically adjust image resolution and disparity search range allows the stereo processing block 592 to perform real-time balancing between resolution, range, and frame-rate. Note that the stereo processing block 592 itself isn't necessarily responsible for scaling the image data; image scaling can be done in the pre-processing pipeline shown in FIG. 9B.

The ability to dynamically reconfigure the searched disparity range allows the processor 510 to adjust how much of the 3D depth is searched. (Larger disparity search ranges result in the ability to reliably perceive objects closer to the camera, at the cost of increased computation.) The searched depth/disparity volume typically extends from infinity back towards the sensor (a disparity of 0 represents infinity, and increasing disparities represent progressively closer points). As the disparity search range increases, the near-end of the searched depth volume gets closer to the sensor.

In addition, the processor 510 may include an output formatting block 572 that takes the standard pipeline format and converts it to a user-requested format (e.g., colorspace, resolution, byte format) before transmission over an Ethernet connection (Ethernet MAC 560). It may also include a network protocol offload block 570 that offloads generation of network packets from a central processing unit (CPU) 542. The processor 510 may include a feature detection block (additional algorithms block 594) that detects "features" in the image (e.g., points that are relatively unique and good for tracking over multiple frames) using the Harris Corners algorithm or any other suitable algorithm. And it may include a feature tracking block, coupled to the feature detection block, which takes detected features and attempts to match them between frames. By knowing how features have moved between frames, it is possible to estimate the camera's motion.

As understood by those of skill in the art, firmware may configure and monitor the image processing pipeline implemented in FPGA logic. Exemplary firmware may run on a simple soft-core CPU (Xilinx Microblaze) 542 in the FPGA. Standard Xilinx-supplied peripherals can be used to build the rest of the system, including: a DRAM controller 564, AXI DMA bus 590, Ethernet MACs 560, and low-speed input/output (I/O) drivers 540 coupled to auxiliary I/O sources (e.g., I2C, RS232, etc.).

Sensor Calibration

Detection of Calibration Errors

One aspect of reliability is being able to detect system errors and respond appropriately. A source of system errors in fielded sensors—particularly in sensors that include cameras—is calibration drift. Shock, vibration, and thermal effects can all affect the relative positions of internal components, leading to (potentially undesired) changes in sensor geometry and imaging parameters. To account for these calibration errors, the system may recover one or more of the following sets of parameters as described below: parameters describing the projection geometry and lens distortion of the stereo camera; parameters describing the position and orientation of the laser scanner with respect to the spindle; and parameters describing the position and orientation of the spindle with respect to the stereo camera.

Image Consistency Evaluation: Projection Geometry and Lens Distortion of the Stereo Camera The cameras in an inventive sensor unit may be calibrated to establish a known relationship between the 3D positions of objects being observed and the 2D positions to which they are projected in the left and right images. When the projected positions of objects are not consistent with expectations, it indicates problems with the calibration. For example, when the cameras are correctly calibrated, objects in the scene appear on the same scan lines in left and right images. By watching for objects that appear on different scanlines in the left image than they do in the right, the system can detect calibration drift. Similarly, when the cameras are correctly calibrated, objects in the far distance appear at the same left-right position in each image. As objects move closer to the camera they appear at increasingly different left-right positions in the two images. This difference in left-right position is called stereo disparity. In one check of calibration accuracy, the user can be instructed to point the camera into the distance, and then disparities that are far from zero indicate calibration errors. The object positions (and differences in object position) measured from the stereo image pairs can also be correlated with laser rangefinder measurements of the object positions as described below.

Figure 10:
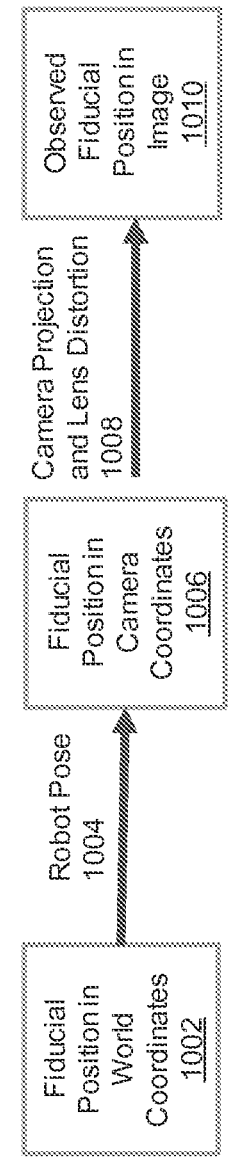
FIG. 10 is a flowchart that illustrates a process for stereo sensor calibration.

FIG. 10 illustrates a process 1000 for calibrating a stereo camera. In block 1002, one or more stationary fiducials are placed or identified within a particular environment. Once the fiducials are in place, the system is moved through a series of positions and orientations, called "poses," in block 1004, e.g., using the end-effector of an industrial robot. At each pose the resulting camera images are examined to determine the image location of the stationary fiducial(s) (block 1010). Each combination of pose and observed image location corresponds to a projection equation 1008.

The data collected in the stereo calibration process 1000 can be used to estimate unknown parameters, including the fiducial position in world coordinates, the position and orientation of the camera with respect to the end effector of the robot, the camera projection geometry, and lens distortion. The known parameters in the stereo calibration process 1000 are the observed position of the fiducial in the image, and the position and orientation of the robot end effector in world coordinates. The unknown parameters are recovered by aggregating many of these projection equations, and solving—e.g., using nonlinear least squares or a similar optimization—for the unknown parameters that most nearly match the observations.

Laser Consistency Evaluation: Position and Orientation of the Laser Scanner with Respect to the Spindle As described above and shown in FIGS. 1A and 8A-8D, an exemplary inventive sensor unit may include a laser rangefinder with a laser that can rotate continuously around a laser spindle. This means that the laser rangefinder measures most parts of the scene twice: once by the left side of the beam as it scans past, and then 180 degrees later as the right side of the beam passes. If laser calibration is correct, these two sets of measurements will align. Misalignment indicates poor calibration and can be used to re-calibrate (heal) the sensor unit.

Figure 11:
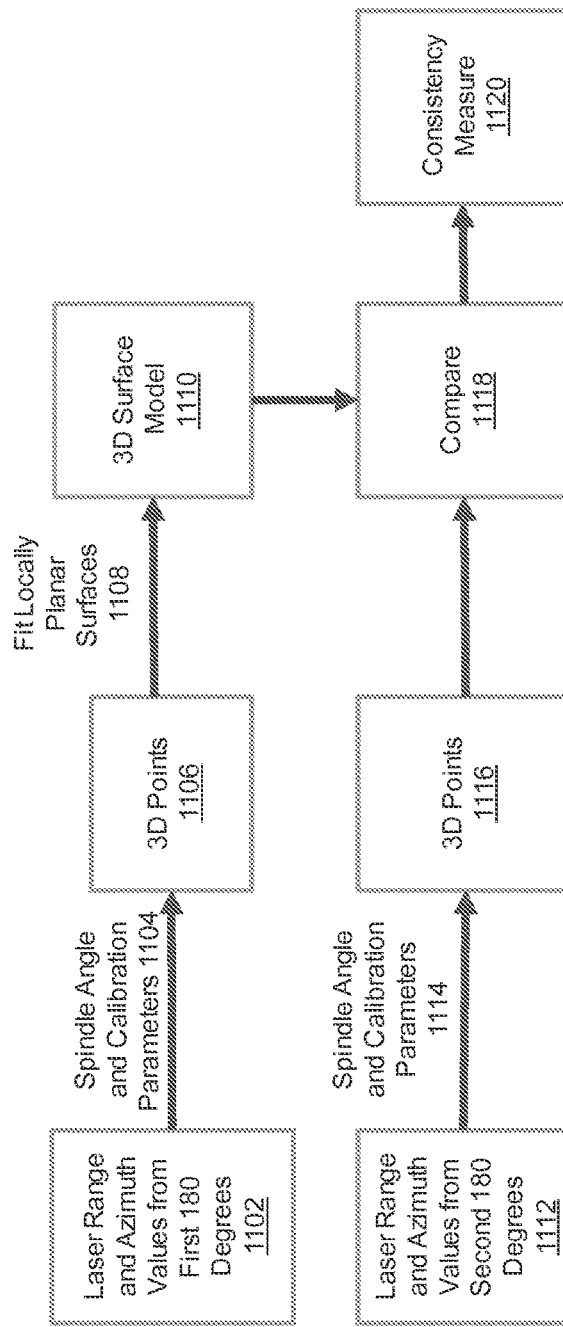
FIG. 11 is a flowchart that illustrates a process for laser sensor (LIDAR) calibration.

FIG. 11 illustrates a LIDAR calibration process 1100 that employs nonlinear optimization to recover the position and orientation of the laser scanner with respect to the spindle. In this case, the system is held stationary in a fixed scene, and laser data are gathered while the spindle is rotated. During a complete rotation of the spindle, most parts of the scene are observed twice by the laser. To see this, consider a laser scanning to the left of a particular object in the scene. This scan yields a first set of laser range and azimuth values 1102. Next consider rotating the spindle approximately 180 degrees to the right such that the laser addresses the same object to yield a second set of laser range and azimuth values 1112. Each laser observation corresponds to a 3D point (1106 and 1116) that can be calculated based on the spindle angle (1104 and 1114) and an estimate of the position and orientation of the laser scanner with respect to the spindle. To assess the consistency of the first 180 degree scan (1102) and the second 180 degree scan (1112), the processor defines a "calibration error" function that fits locally planar surfaces to the first observation (step 1108), and then computes the distance (1118) between the second observation and an appropriate planar surface model (1110) to yield a consistency measurement (112). The value of this error function depends on the calibration parameters, which can be recovered by using nonlinear least squares optimization, simulated annealing, or a similar approach, to find the values most consistent with the observed laser ranges.

Inter-Sensor Consistency: Position and Orientation of the Spindle with Respect to the Stereo Camera Both the laser and the stereo camera assembly can produce 3D models of the scene. If the previous checks are consistent with good calibration, then these models can be compared to each other in order to verify that the geometric relationship between the sensors is accurate. Unfortunately, measurement errors in the stereo images project into 3D space in a way that makes it difficult to do this comparison accurately. This can be addressed by projecting the laser model into the images as if the laser model were being seen by the cameras, and then comparing the result in image space. This approach to evaluating calibration can be implemented using natural scenes or purpose-built calibration targets.

Figure 12:
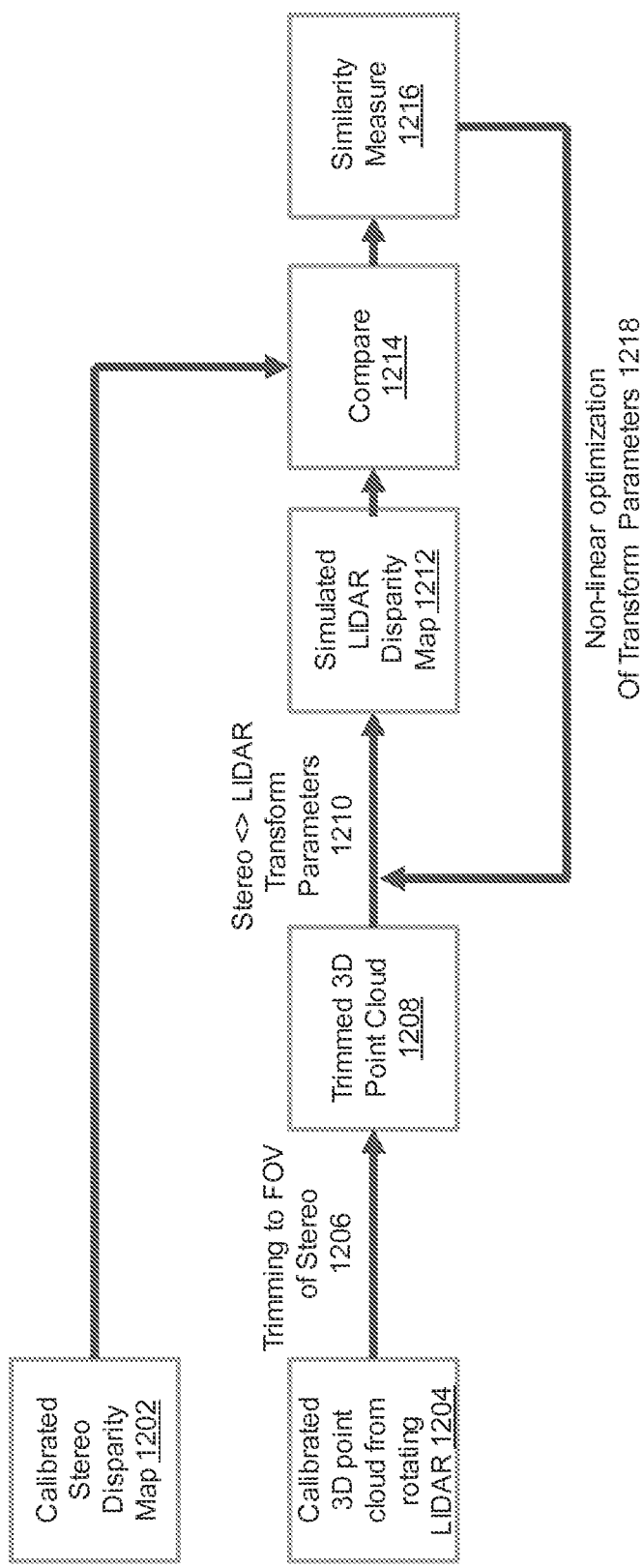
FIG. 12 is a flowchart that illustrates a process for laser to stereo sensor calibration.

FIG. 12 illustrates a process for calibrating or registering the stereo sensor with respect to the laser spindle. If the laser rangefinder (LIDAR) and stereo sensor have been calibrated, e.g., using the processes shown in FIGS. 10 and 11, the laser data can transformed into a 3D laser point cloud 1204 and the camera images can be used to calculate a stereo disparity map 1202 at a large number of pixels in the image. The processor trims (1206) the laser point cloud 1204 to match the field of view (FOV) of the stereo sensor. The processor transforms the resulting trimmed point cloud 1208 into the stereo sensor coordinate system using LIDAR-to-stereo transform parameters 1210 to produce a simulated LIDAR disparity map 1212. Next, the processor compares (1214) the simulated LIDAR disparity map 1212 to the stereo disparity map 1202 to produce a similarity measurement 1216, which is used to nonlinearly optimize (1218) the LIDAR-to-stereo transform parameters 1210.

As understood by those of skill in the art, the stereo disparity corresponds to the 3D positions of the objects in the camera images. These 3D positions are reflected in the 3D point cloud 1204 from the laser. By transforming the 3D laser observations into the coordinate system of the stereo camera, it is possible to generate a predicted disparity image 1212 and compare it with the actual disparity image 1202 from the stereo camera. This transformation depends on the position and orientation of the spindle with respect to the stereo camera, and again the processor uses nonlinear optimization to find calibration parameters 1208 that increase the similarity between the predicted and observed disparity images.

Laser Rangefinder Calibration

Inventive sensor units may use one or both of the following techniques to calibrate the laser rangefinder: (1) calibration targets of known geometry are measured with the laser, and then the observations of these known targets are used to back-solve for the laser calibration parameters; and (2) calibration targets of unknown geometry or unknown position are observed by the laser, and calibration parameters are adjusted to increase laser consistency (see above).

Inventive sensor units may support several types of camera calibration, including conventional approaches that involve recording measurements of known objects, or calibration targets, and searching for sets of calibration parameters that are most consistent with the observations. For instance, the stereo camera may detect a calibration target's position in a series of unknown locations and/or orientations. The resulting images are used to determine the calibration parameters and the unknown positions. This works because the known shape of the calibration target provides information, even when its position is not known. This approach can be augmented by measuring the positions and geometries of calibration targets using the laser rangefinder and using the laser range data to verify the accuracy of the positions and/or calibration parameters determined from the stereo image data.

The precise internal timing of the inventive sensor units enables another camera calibration approach. When the cameras are not fitted with infrared filters, the reflection of the laser beam from an object in the scene may appear as a spot in the images. This spot can be detected using image processing techniques. Its position provides correspondence between the laser-measured 3D point and a pair of 2D locations in the left and right images. The rotation of the laser provides a collection of these correspondences, which are exactly the input to compute camera calibration.

A generalization of the previous approach uses the correspondence between 3D laser measurements and 2D image positions, but does not require the laser spot to be visible in the images. This allows the technique to work even when the cameras are fitted with infrared filters, or when the scene is illuminated too brightly for the laser spot to be seen. In this case, the cameras and scene are motionless while the laser captures a large number of 3D points. If the laser reflection were visible to the cameras, then each 3D point could be matched to 2D image locations by detecting the laser spot in left and right images. Instead, matches are found by projecting the 3D points into the camera images using hypothesized calibration parameters, and pretending the projected 2D locations are correct. If the hypothesized calibration parameters are not correct, then the projection will not be correct, the 3D-to-2D correspondences will be incorrect, and—assuming the scene is sufficiently rich—many of the resulting pairings will violate image consistency metrics. The calibration parameters can be adjusted so as to reduce this violation.

Disparity Map Synthesis and Comparison

Figure 13B:
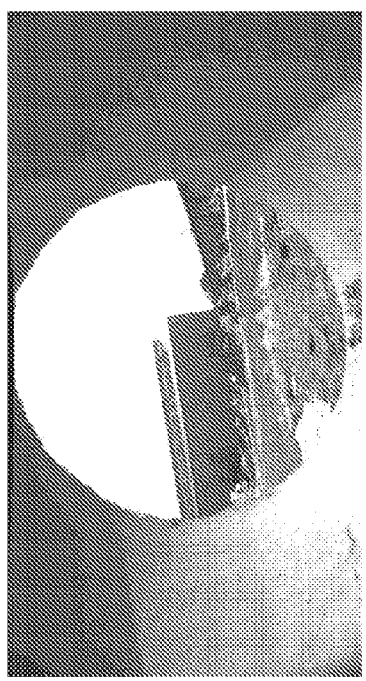
FIGS. 13A-13D show four images acquired with left and right cameras in a stereo imaging system: a first image acquired with the left camera (FIG. 13A); a first image acquired with the right camera (FIG. 13B); a second image acquired with the left camera (FIG. 13C); and a second image acquired with the right camera (FIG. 13D).
Figure 13D:
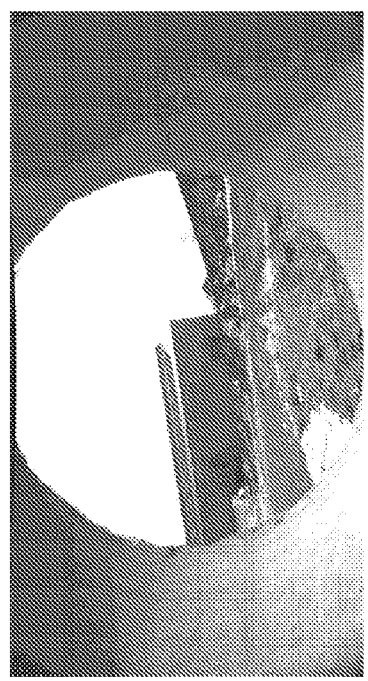

FIG. 13A-13D show four images acquired with left and right cameras in a stereo imaging system: a first image acquired with the left camera (FIG. 13A); a first image acquired with the right camera (FIG. 13B); a second image acquired with the left camera (FIG. 13C); and a second image acquired with the right camera (FIG. 13D). Because the cameras view the scene (environment) from different positions/angles, they acquire the images from different perspectives. The processor may use pairs of these images to generate stereo images and disparity maps as well understood in the art. If the stereo imaging system moves or shifts between acquisitions, then the stereo images may show stereo views of the scene from different perspectives.

Figure 13A:
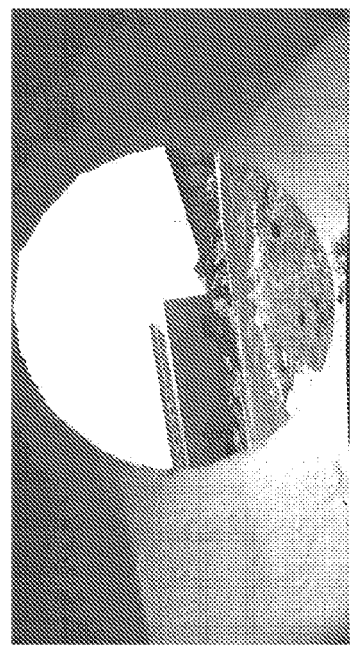
Figure 13C:
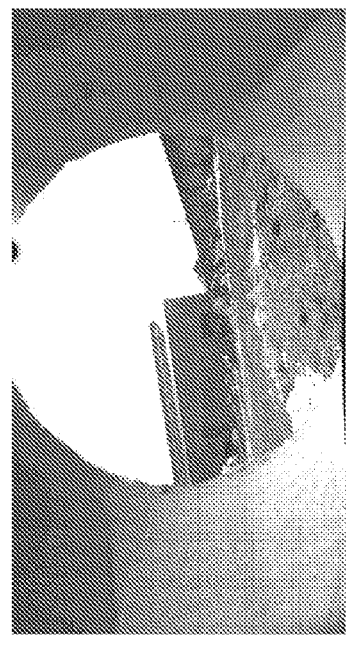
Figure 14A:
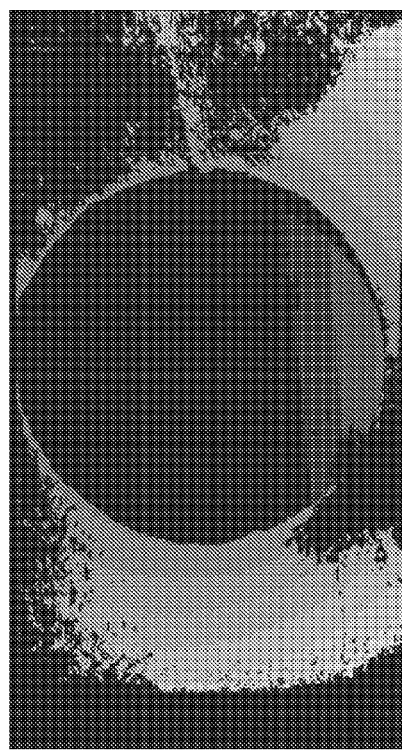
FIG. 14A shows a disparity map based on the images shown in FIGS. 13A and 13B.
Figure 14B:
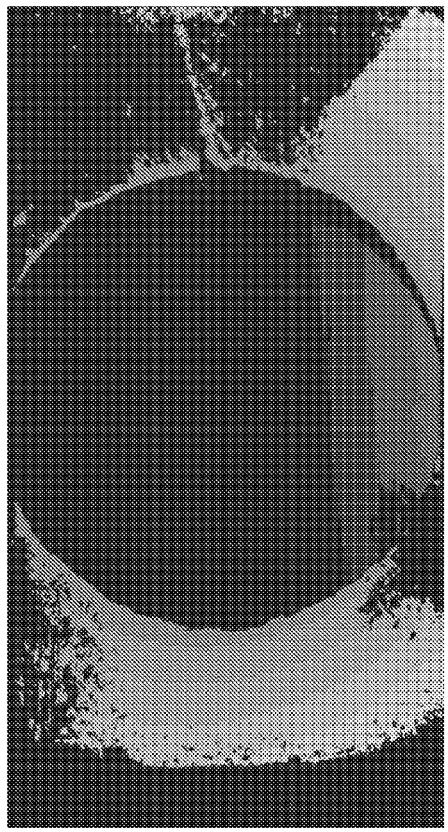
FIG. 14B shows a disparity map based on the images shown in FIGS. 13C and 13D.
Figure 15:
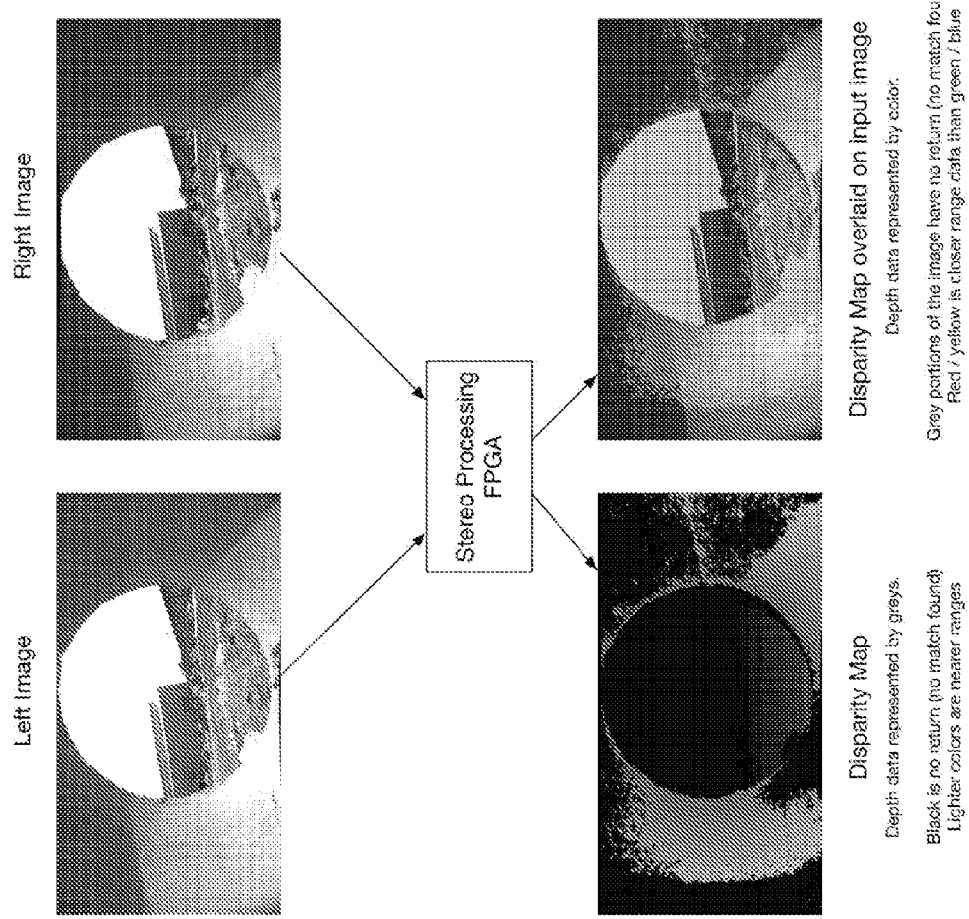
FIG. 15 illustrates synthesis of a disparity map with and without input image information (lower left and right, respectively) from left and right images (upper left and right, respectively).

FIG. 14A shows a first disparity map based on the left and right images shown in FIGS. 13A and 13B. And FIG. 14B shows a second disparity map based on the left and right images shown in FIGS. 13C and 13D. As well understood by those of skill in the art, disparity refers to the distance between two corresponding points in the left and right image of a stereo pair. This distance can be represented as a vector between two pairs of coordinates—one pair of coordinates for the left image, and another pair of coordinates for the right image. The magnitude of this vector is sometimes called the "disparity value." Computing the disparity values for every pixel in the stereo image yields a disparity map, e.g., as illustrated in FIG. 16.

Figure 16A:
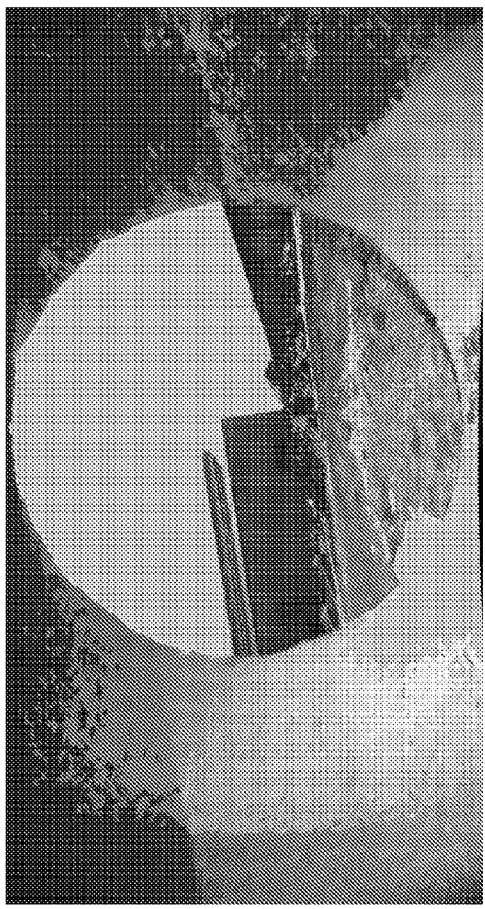
FIGS. 16A and 16B show image data overlaid on the disparity images of FIGS. 14A and 14B, respectively.
Figure 16B:
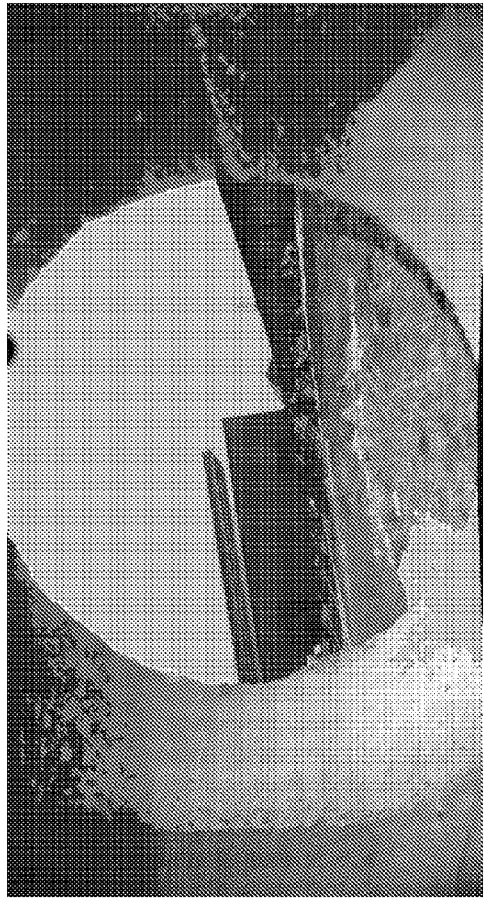
Figure 17A:
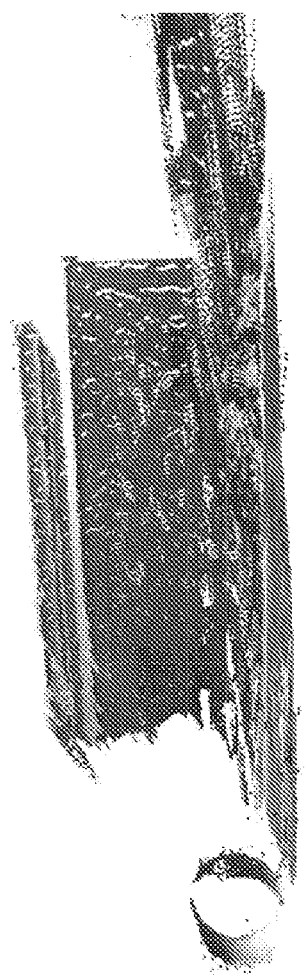
FIGS. 17A and 17B show 3D projections of the disparity data shown in FIGS. 14A and 14B, respectively.
Figure 17B:
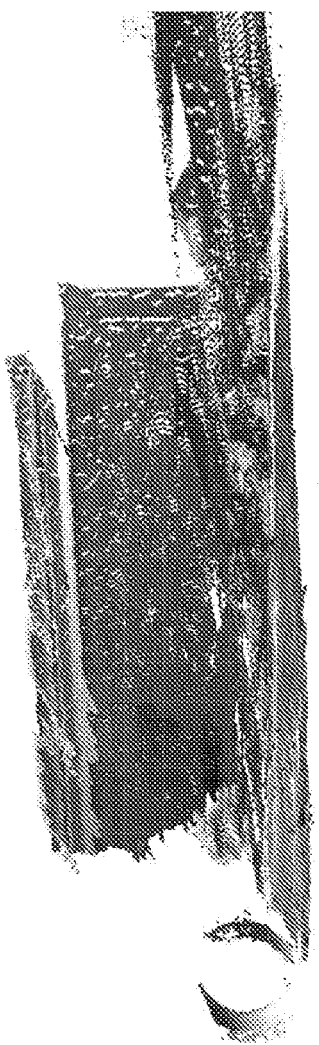

FIG. 16 also shows that the disparity map can be overlaid on the image data to produce a composite image that includes depth data. For instance, FIGS. 17A and 17B show image data of FIG. 13 overlaid on the disparity images of FIGS. 14A and 14B, respectively. The depth data appears in color, with gray portions of the image corresponding to no return (no match found), red/yellow representing near points in the scene, and green/blue representing far points in the scene.

FIGS. 17A and 17B are 3D projections of the disparity maps shown in FIGS. 14A and 14B, respectively. Every pixel of FIGS. 14A and 14B is projected into 3D space using the stereo sensor's calibration data and then colored with data from FIGS. 13A and 13B, respectively. Here the source images are monochrome (black and white), but source images can also be color, which results in color 3D scenes. The 3D scenes shown in FIGS. 17A and 17B comprise raw 3D data (point clouds); the data are not triangulated or meshed. But the processor can determine much about the scene and the sensor from the raw 3D point clouds, including estimates of locations and orientations of objects in the environment, including the stereo sensor's own position and orientation.

For example, if FIGS. 17A and 17B are overlaid on top of each other and aligned by matching 3D features (like the pipe, ground, and building in the distance) then differences between the two scenes can be detected and analyzed. One difference is the perspective change of the stereo camera between capturing the source imager shown in FIG. 13. This forward perspective shift can be measured by calculating the difference in the length of pipes shown in FIGS. 17A and 17B. Additionally, slight roll of the sensor can be detected by fitting a plane to the ground data and measuring the difference in angle between the ground plane and each source image's virtual horizon. Yaw of the sensor can likewise be measured by determining the difference in angle between the building and each source image's virtual forward axis.

The processor can detect other differences between disparity maps and 3D point clouds once the disparity maps and/or 3D point clouds are aligned. For instance, the processor can detect movement of targets or objects within the scene by identifying regions where the scene-to-scene 3D match is less accurate or has more error. The processor may use this movement detection to sense 3D misalignment caused by a person walking by or a vehicle driving in the distance. The processor can isolate and extract moving 3D features from the rest of the scene (e.g., the static portion of the scene). In some cases, the processor can also calculate 3D position and 3D trajectory of the moving objects (including its own motion).

FIGS. 18A and 18B show images synthesized from laser point cloud data and stereo image data with and without smoke obscuring the sensor, respectively. Without smoke, the laser point cloud is an accurate representation of the scene. Smoke and other obscurants, like dust, can absorb or scatter the laser beam as it propagates to and/or from the targets, corrupting the laser rangefinder data. If the smoke transmits light at visible (or possibly infrared) wavelengths, then the stereo sensor may still be able to produce an accurate representation of the scene.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embodied in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A stereo vision system for an autonomous vehicle, the stereo vision system comprising:
    a housing defining a cavity and at least one exterior surface;
    a unitary frame within the cavity, the unitary frame defining at least one mounting surface;
    a first imager, mounted to the at least one mounting surface, to acquire images of an environment from a first perspective;
    a second imager, mounted to the at least one mounting surface, to acquire images of the environment from a second perspective different than the first perspective;
    a collection of processing units, the collection of processing units including a processing unit disposed in the housing, wherein the collection of processing units is operable to:
        obtain a three-dimensional point cloud of the environment from a LIDAR system;
        generate a first disparity map based on images acquired by each of the first imager and the second imager;
        calibrate each of the first imager and the second imager, using each of the three-dimensional point cloud and the first disparity map, by determining a similarity between data from the three-dimensional point cloud of the environment and the first disparity map;
        generate a second disparity map based on images acquired by the calibrated first imager and the calibrated second imager; and
        determine information about the environment using the images acquired by the calibrated first imager, the calibrated second imager, the second disparity map and the three-dimensional point cloud.

2. The stereo vision system of claim 1, wherein the unitary frame consists of a single piece of material.

3. The stereo vision system of claim 1, wherein the first imager and the second imager are disposed on a same plane.

4. The stereo vision system of claim 1, wherein the first imager is disposed in a first plane and the second imager is disposed in a second plane parallel to the first plane.

5. The stereo vision system of claim 1, wherein the first imager is disposed in a first plane and the second imager is disposed in a second plane that intersects the first plane.

6. The stereo vision system of claim 1, further comprising:
    at least one of at least one pin and at least one bolt fastening at least one of the first imager and the second imager to the at least one mounting surface.

7. The stereo vision system of claim 1, further comprising:
    a flexible cable coupling the second imager to the processing unit.

8. The stereo vision system of claim 1, further comprising:
    an internal wall disposed within the cavity and in thermal communication with the at least on exterior surface.

9. The stereo vision system of claim 8, further comprising:
    a thermally conductive material that is disposed within the cavity and in thermal communication with the internal wall and the processing unit, to conduct heat generated by the processing unit to the at least one exterior surface via the internal wall so as to dissipate the heat generated by the processing unit.

10. The stereo vision system of claim 1, wherein the collection of processing units includes a field programmable gate array.

11. The stereo vision system of claim 1, wherein the collection of processing units is further operable to:
   determine a position of the autonomous vehicle.

12. The stereo vision system of claim 1, wherein determining information about the environment includes determining a position of one or more moving objects within the environment.

13. The stereo vision system of claim 1, further comprising:
   a rectification processing block to rectify the images from the first imager and the second imager.

14. The stereo vision system of claim 1, wherein the collection of processing units includes logic to separately trigger signals to the first imager and to the second imager so that the signals are received at the first imager and second imager at the same time.

15. The stereo vision system of claim 1, wherein the LIDAR system includes:
   a laser mounted on top of the housing to illuminate one or more objects in the environment with laser light; and
   a sensor to detect laser light scattered and/or reflected by the one or more objects and to provide a range signal representative of a distance to the one or more objects based on the detected laser light, wherein the three-dimensional point cloud is based on the range signal representative of the distance to the one or more objects.

* * * * *